(12) United States Patent
Wang et al.

(10) Patent No.: US 6,631,478 B1
(45) Date of Patent: Oct. 7, 2003

(54) TECHNIQUE FOR IMPLEMENTING HIGH PERFORMANCE STABLE STORAGE HIERARCHY IN A COMPUTER NETWORK

(75) Inventors: Zhenyu Wang, New York, NY (US); Qingming Ma, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/336,279

(22) Filed: Jun. 18, 1999

(51) Int. Cl.$^7$ ................................................ G06F 11/00
(52) U.S. Cl. ........................................................ 714/15
(58) Field of Search ................................ 714/5, 15, 20; 711/147, 153

(56) References Cited

U.S. PATENT DOCUMENTS

| | | | | |
|---|---|---|---|---|
| 4,734,855 A | * | 3/1988 | Banatre et al. | 365/189.05 |
| 5,197,148 A | * | 3/1993 | Blount et al. | 700/79 |
| 5,499,364 A | * | 3/1996 | Klein et al. | 709/202 |
| 5,684,944 A | * | 11/1997 | Lubbers et al. | 714/52 |
| 5,983,364 A | * | 11/1999 | Bortcosh et al. | 714/25 |
| 6,085,298 A | * | 7/2000 | Ohran | 711/154 |
| 6,295,611 B1 | * | 9/2001 | Connor et al. | 714/15 |
| 6,341,338 B1 | * | 1/2002 | Dennie | 711/147 |
| 6,360,220 B1 | * | 3/2002 | Forin | 707/201 |

OTHER PUBLICATIONS

Henry M. Mashburn, Mahadev Satyanarayanan, David Steere, Yui W. Lee, *RVM: Recoverable Virtual Memory, Release1.3*, Sep. 1997.

Yennun Huang and Chandra Kintala, *Software Implemented Fault Tolerance: Technologies and Experience*, IEEE, 1993, pp. 2–9.

* cited by examiner

*Primary Examiner*—Robert Beausoliel
*Assistant Examiner*—Bryce P. Bonzo
(74) *Attorney, Agent, or Firm*—Beyer Weaver & Thomas LLP

(57) ABSTRACT

A technique is provided for implementing a high performance stable storage system which provides stable and fast storage services to applications built on top of one or more operating system (OS) kernels in a computer network. The stable storage hierarchy comprises at least two levels of stable storage. The first level of stable storage is provided by one or more byte-addressable stable memory regions (SMRs) which may reside within the main memory of the computer network. Each stable memory region (SMR) provides a data structure for storage of essential or key data related to one or more client processes. The SMR is configured to provide an access interface which supports atomic access to its data structure. The SMR is also configured to be resilient to application failures. Further the SMR is configured to support concurrent access of its data by multiple clients. Additionally, the SMR is configured to support incremental updating of data within its data structure using pointer-based data transfer technique. The second level of the high performance stable storage hierarchy includes any traditional file system based stable storage system which is configured to communicate with one or more SMRs. The second level of the high performance stable storage system of the present invention includes "non-volatile", writeable memory which is able to preserve data even in the event of an operating system crash or a system power failure. The technique of the present invention is able to boost system availability and performance considerably without the typical performance penalties incurred by traditional stable storage systems.

34 Claims, 16 Drawing Sheets

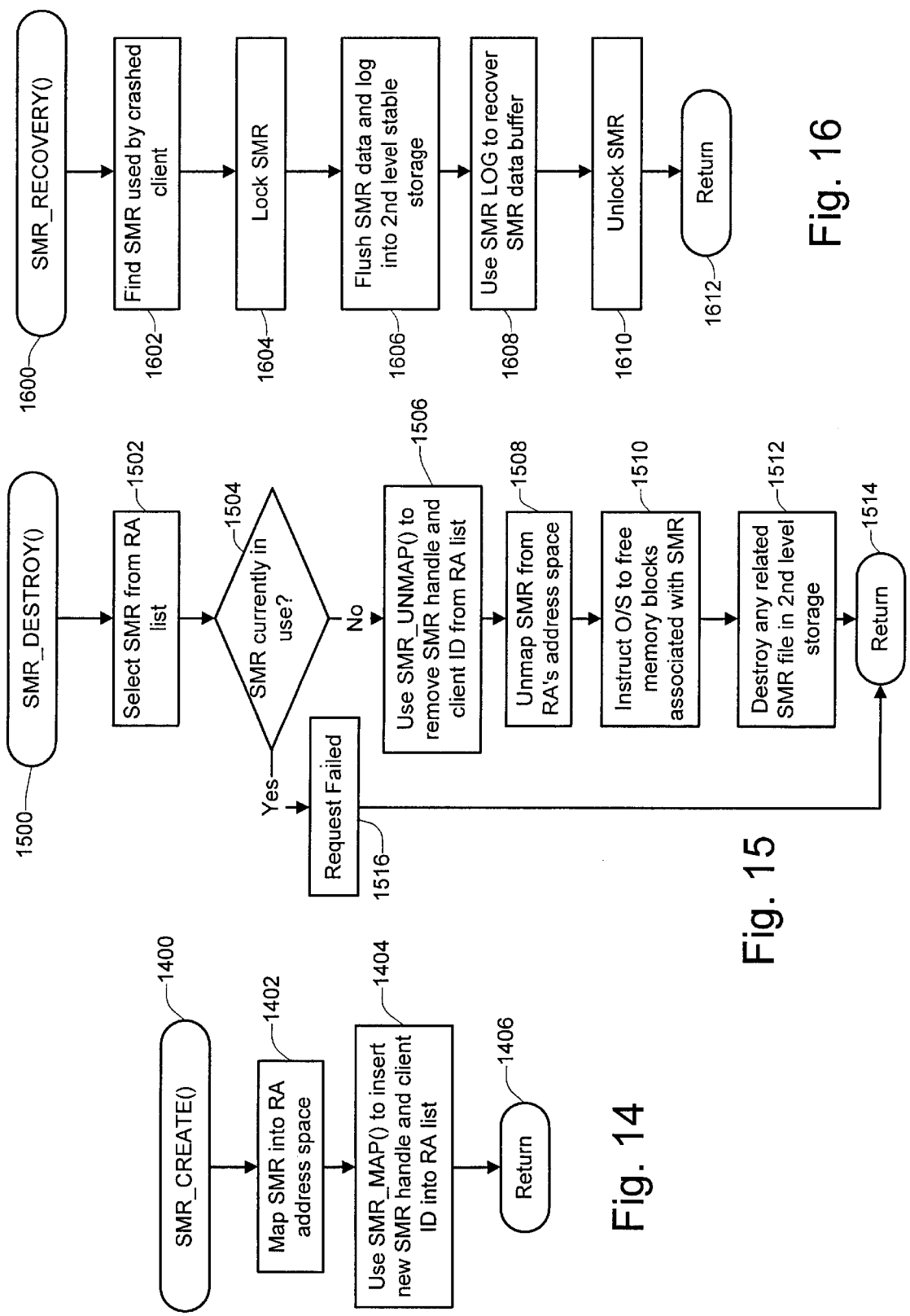

TECHNIQUE FOR IMPLEMENTING HIGH PERFORMANCE STABLE STORAGE HIERARCHY IN A COMPUTER NETWORK

BACKGROUND OF THE INVENTION

1. Field of the Invention

The present invention relates to computer networks, and more specifically to providing a memory management technique for implementing a high performance stable storage system in a computer network.

2. Background

Service availability and fault tolerance have become important features in building reliable communication systems, networking systems, and reliable distributed transactions. In such an environment, it is extremely important to provide continuous, non-interrupted service to end users. Further, in the event of a service process crash, it is essential that the crashed process be restarted as quickly as possible so that end users do not experience any disruption in service. Conventionally, in order to restart a crashed service process quickly, and reinitialize it correctly, certain critical application data relating to the service process is stored in a stable storage system which is part of the system or network on which the service process is running.

A stable storage system is an abstraction of a perfect storage system which is able to survive certain system failures such as, for example, communication failures, application failures, operating system failures, processor failures, etc. In order to ensure the integrity of key system data and to avoid data inconsistency (caused, for example, by a process crash which occurs in the middle of a system operation), client processes or applications store key data within a stable storage system so that the data can be rolled back to a previously consistent state if a failure occurs. Typically, a stable storage system provides atomic read and write operations to stored data, and keeps the data intact even when failures occur. For example, in a router system, the network state information such as, for example, Forwarding Information Base (FIB), reservation state, and multi-cast group information are stored in stable storage systems in order to restore packet forwarding processes quickly in the event of a process crash.

Traditional stable storage systems use either a file system-based storage system, or a reliable RAM disk. Examples of the traditional file system-based storage systems include the well known Andrew File System RVM and LibFT, from Lucent Technologies of Murray Hill, N.J. An example of a conventional file system-based stable storage system is shown in FIG. 1 of the drawings.

As shown in FIG. 1, stable storage system 104 comprises a block of "non-volatile" memory, such as, for example, a hard drive. Typically, the stable storage system 104 is configured to operate independently of the network operating system in order to preserve the data within the stable storage system in the event of an operation system or network crash. A plurality of clients 102, which represent various applications or processes running on the network, write and/or read essential data to and from stable storage system 104. The data is stored within a plurality of data files 110. An access manager 106 manages the data which is sent to and retrieved from data files 110. Additionally, the access manager manages a plurality of log or back up files 108 which are used for tracking data which is written to the data files 110.

While the file-system based approach to stable storage may be resilient to process and OS failures, this approach imposes high performance penalties because of multiple inter-process buffer copying and disk I/O latency. Further, the file system based stable storage system does not support fast, incremental updating of state fragment data such as, for example, FIB entries or TCP message sequence numbers. Rather, conventional disk storage systems support sequential access of data which is managed using sector allocations. To update data within a data file 110, the new data is typically appended to the end of the data file. In order to retrieve this new data appended to the end of the data file, the entire data file must be accessed sequentially. This slow method of accessing and updating data is undesirable, particularly in systems such as embedded systems (e.g., router systems) where fast recovery is essential to avoiding service disruption.

Alternatively, RAM disks may be used for implementing for stable storage systems. However, the reliable RAM disk approach is undesirable for most commercial systems since it requires installation and support of additional hardware.

While conventional file-system based stable storage systems may be used for storage of essential application data, there exists a continual heed to provide improved techniques for implementing stable storage in conventional computer systems or networks.

SUMMARY OF THE INVENTION

According to specific embodiments of the invention, a technique is provided for implementing a high performance stable storage system which provides stable and fast storage services to applications built on top of one or more operating system (OS) kernels in a computer network.

According to a specific embodiment of the invention, a unique high performance stable storage hierarchy is provided comprising two levels. A set of byte-addressable stable memory regions (SMRs) forms the first level stable storage. Each stable storage memory region (SMR) includes a data structure for storing desired or essential data related to one or more client processes. The SMR is configured to provide an access interface which supports atomic access to its data structure. The SMR is also configured to be resilient to application failures. For example, if a client dies or crashes, the data contained within the SMR will still be accessible to other applications or network components. Further, the SMR is configured to be byte addressable, and configured to share at least a portion of its address space with at least one client process. The term "byte-addressable" refers to the capability of a client to write data into an SMR data buffer directly using pointers (instead of appending logs to a file like in traditional stable storage systems).

The second level of the high performance stable storage hierarchy includes any traditional file system based stable storage system which is configured to communicate with one or more SMRs. The data contained in an SMR can be flushed into (and loaded from) the second level stable storage device atomically upon request.

In accordance with a specific embodiment of the present invention, the plurality of SMRs form a high performance fault resilient "cache" layer to traditional file system based stable storage systems. On most platforms where processors and operating systems are much more reliable than applications, this layer itself can boost the system availability considerably without the typical performance penalties incurred by traditional stable storage systems. This performance gain is especially important for applications which perform fast incremental state updates for small transactions.

An alternate embodiment of the present invention provides a data storage system implemented in a computer system. The computer system includes an operating system and at least one CPU. The data storage system includes at least one SMR managed by the operating system. The SMR includes at least one first data structure for storing data related to a client process. Further, the SMR is configured or designed to support atomic access of data within the first data structure. The SMR is also configured or designed to support incremental updating of client process data within the first data structure. The incremental updating is implemented using a pointer-based data transfer mechanism. The SMR is further configured or designed to allow at least one other client process to access data within the SMR data structure. The SMR may also include a memory based semaphore for providing exclusive access to the SMR when desired (e.g. when writing data to the SMR data structure). The SMR may also include a reference counter for keeping track of the number of client processes accessing the SMR.

An additional aspect of the above-described data storage system provides a system manager configured or designed to monitor the client processes and to detect client failures. The data storage system may also include a recovery agent configured or designed to perform recovery of a failed client process by utilizing at least one SMR. The SMR may be further configured or designed to share at least a portion of memory address space with the operating system, the recovery agent, and/or at least one client process.

An alternative embodiment of the present invention provides a file system-based stable storage system in a computer system. The computer system includes an operating system and at least one CPU. The stable storage system includes one SMR having at least one data structure for storing data related to a client process. The SMR is configured to support atomic access of data within the first data structure, and is configured to share at least a portion of memory address space with the client process and the operating system. The SMR may also be configured to support direct memory to memory transfer of data from the client heap to the SMR data structure or vice-versa. The storage system may also include non-volatile memory configured to communicate with the SMR. The non-volatile memory includes a second data structure which is configured or designed to support atomic access of data within the second data structure.

Alternate embodiments of the present invention provide a method and computer program product for storing data in a computer network. The network includes at least one operating system and at least one stable storage memory region (SMR) managed by the operating system. The SMR includes at least one data structure. The network also includes non-volatile memory having at least one second data structure configured to communicate with the SMR. Client application data in the first data structure is accessed atomically. Once accessed, the client data is then atomically transferred between the first data structure and the second structure. An additional aspect of this embodiment includes incrementally updating a portion of state fragment data within the SMR data structure by performing a direct memory to memory copy of state fragment data from a client heap to the SMR. Where the above-described aspect is implemented as a computer program product, the computer program product will include a computer readable media having computer readable code embodied therein for implementing the above-described process.

Further embodiments of the present invention provide a method and computer program product for implementing stable storage in a computer system. The computer system includes at least one operating system and includes non-volatile memory. The non-volatile memory has at least one second data structure for storing data related to a client application. At least one stable storage memory region (SMR) is provided within the main memory of the computer system for storing the client application data. The SMR is managed by the operating system and includes at least one first data structure. Further, the SMR is configured to share at least a portion of memory address space with the operating system and with the client process. Also, the SMR is configured to communicate with the non-volatile memory. The client application data within the SMR data structure is accessed atomically. The SMR may be configured to provide concurrent access of the client application data to at least one other client. Further, the SMR may be configured to be resilient to a client crash whereby the SMR and data therein are able to survive the client crash. The SMR may be used to recover client data in response to detection of a client crash. Further, consistent client data may be retrieved from the second data structure into the first data structure for use by a client application. Additionally, client application data may be flushed from the SMR to the non-volatile memory in response to a request or signal initiated by the client. Where this embodiment is implemented as a computer program product, the computer program product will include a computer readable media having computer readable code embodied therein for implementing the above-described process.

Additional embodiments of the present invention provide a method and computer program product for implementing a memory management system in a computer network. The network includes at least one operating system and at least one SMR managed by the operating system. The SMR includes at least one data structure. The network includes non-volatile memory configured to communicate with the SMR, wherein the non-volatile memory has at least one second data structure. When a client crash is detected, an appropriate SMR which is utilized by the crashed client is located. Consistent client data is then atomically transferred from the second data structure to the first data structure to thereby allow a restarted client application to quickly reinitialize itself using the consistent application data retrieved into the SMR. Where this embodiment is implemented as a computer program product, the computer program product will include a computer readable media having computer readable code embodied therein for implementing the above-described process.

Additional features and advantages of the present invention will become apparent from the following description of its preferred embodiments, which descriptions should be taken in conjunction with the accompanying drawings.

BRIEF DESCRIPTION OF THE DRAWINGS

FIG. 14 shows a flow diagram of a specific embodiment of an SMR_Create( ) Procedure 1400 of the present invention.

FIG. 15 shows a flow diagram of a specific embodiment of an SMR_Destroy( ) Procedure 1500 of the present invention.

FIG. 16 shows a flow diagram of a specific embodiment of an SMR_Recovery( ) Procedure 1600 of the present invention.

DETAILED DESCRIPTION OF THE PREFERRED EMBODIMENT

Figure 1:
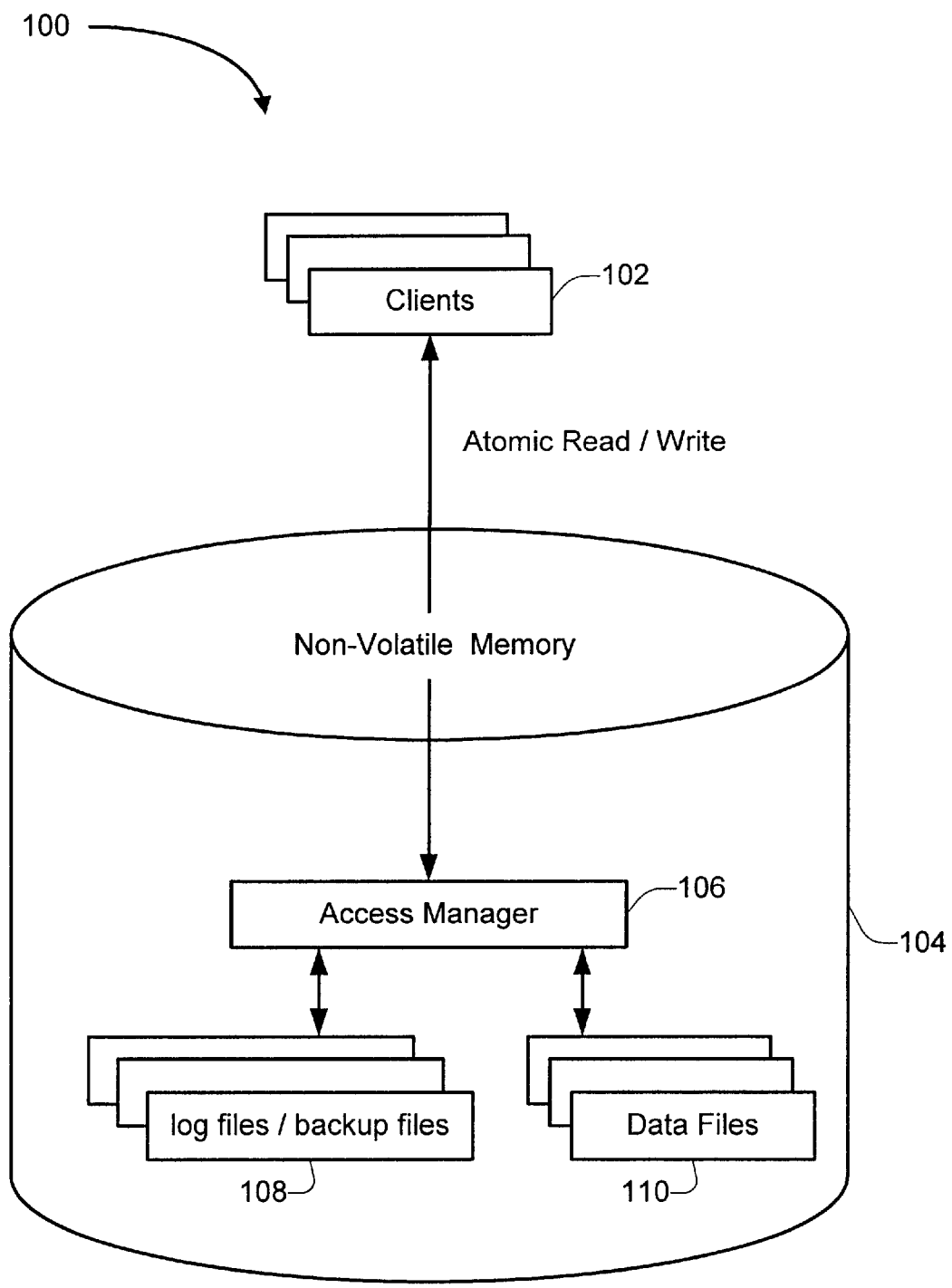
FIG. 1 shows a schematic block diagram of a conventional stable storage system used for storing selected client application data.

According to a specific embodiment of the present invention, the high performance stable storage system includes a multiple stable storage hierarchy which comprises at least two levels of stable storage. The first level of stable storage is provided by one or more byte-addressable stable memory regions (SMRs). Each stable memory region (SMR) provides a data structure for storage of essential or key data related to one or more client processes. Further, each SMR is writeable, and is configured to communicate with a secondary storage device residing at the secondary storage level of the stable storage system. The second level of the high performance stable storage system of the present invention includes "non-volatile", writeable memory which is able to preserve data even in the event of an operating system crash or a system power failure.

Conventional stable storage systems are based upon a premise that operating systems and/or client applications often become unstable and crash during operation of the computer system or network. For this reason, conventional wisdom teaches that it is desirable to store key data into non-volatile memory so that this data may be preserved in the event of an operating system crash or a client crash.

Contrary to conventional wisdom, however, the present inventive entity has observed that processor failures and/or OS failures are much less frequent than application failures on most embedded OS platforms. This is particularly true in embedded system applications, such as, for example, router systems, where the small real-time OS kernel is much more stable (MTBF over 10 years) than applications running on top of the OS kernels (such as the forwarding engine and/or control protocols).

Research suggests that operating systems and hardware components are more reliable than software applications which run on top of the operating system and/or hardware components. Typically, conventional embedded operating systems and processors have a high degree of reliability because of their relative product maturity. In contrast, many software applications built on top of the operating system and/or processor (e.g., transport processes, routing processes) are typically produced under specific time constraints by multiple development teams and/or vendors, and tend to be less reliable than the underlying platforms upon which these applications are built. Accordingly, at least one specific embodiment of the present invention is directed to a technique for providing fast and stable storage which is resilient to software application failures.

Compared with traditional stable storage systems, the present invention is particularly suited for network applications for a number of reasons. For example, some traditional systems induce performance overhead by providing a stronger semantics (e.g., tolerating OS failures), which may not be appropriate for every situation. The present inventive entity recognizes that it is the nature of network applications to be able to operate under diverse workloads. Thus, by providing a multi-level stable storage hierarchy, the present invention provides the ability for an application to choose between fast yet reliable first level stable storage and slower yet more reliable second level stable storage. In this way, an application can optimize its performance under diverse workloads by selecting the appropriate level of stable storage desired. This capability is not provided by conventional stable storage systems.

Another significant drawback of conventional stable storage systems which utilize a hardware-based storage implementation is the cost involved for implementing such a system. Software-based conventional stable storage systems, while less costly, suffer from performance penalties, such as, for example, constant disk I/O delay, random disk seeking delay, etc. The high performance stable storage system of the present invention provides a hybrid approach to stable storage which realizes many of the advantages of each type of stable storage system (e.g., hardware-based versus software-based) while overcoming many of the disadvantages associated with each type of system. For example, implementation of the high performance stable system of the present invention is inexpensive since no additional hardware is required or needed for implementation. Additionally, the high performance stable storage system of the present invention avoids constant disk I/O delay by utilizing an SMR data buffer and SMR log which reside within the shared memory portion of the main memory. Further, the technique of the present invention supports fast incremental updating of client state information by configuring the SMR to be byte addressable and to be able to support fast, pointer-based direct memory to memory transfers. Further, the recovery time for a failed client process is greatly decreased using the technique of the present invention. Moreover, the data within a particular SMR may be concurrently accessible to multiple clients while still retaining the advantageous characteristics of direct memory to memory transfer.

Generally, the high performance stable storage technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid stable storage system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the stable storage systems of this invention may be implemented in specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the high performance stable storage system may be implemented on a general-purpose network host machine such as a personal computer or workstation. Further, the invention may be at least partially implemented on a card (e.g., an interface card) for a network device or a general-purpose computing device.

Figure 2:
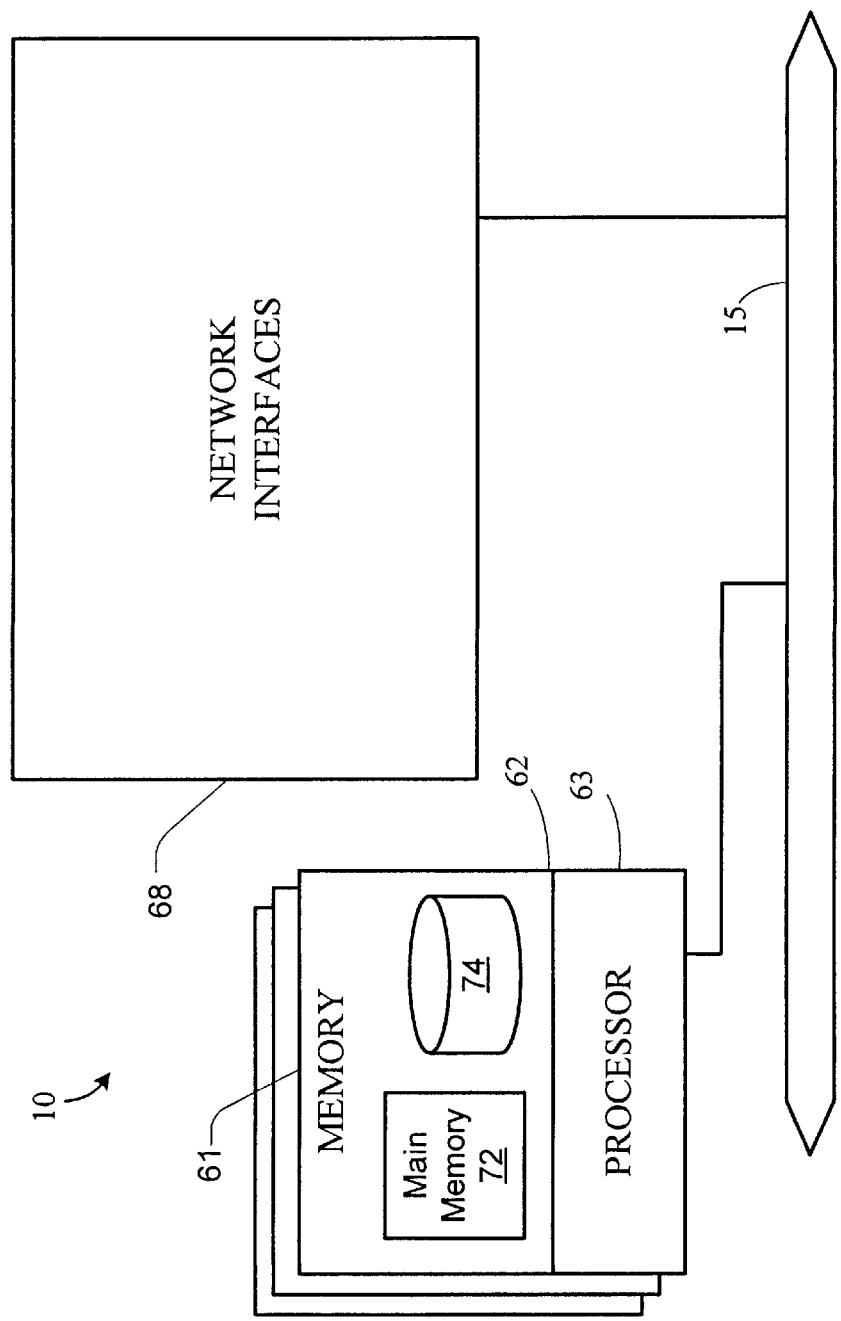
FIG. 2 shows a schematic block diagram of a specific embodiment of a router which may be configured to implement the high performance stable storage system of the present invention.

Referring now to FIG. 2, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for running operating system(s), client processes, memory managers, system managers, recovery agents, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 2 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 61) configured to store program instructions for the general-purpose network operations and for implementing the high performance stable storage procedures described herein. The program instructions may control the operation of an operating system and/or one or more applications, for example. The memory or memories may also be configured to store portions of data from one or more client processes, log/backup data, etc. Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

In a specific embodiment, an SMR will reside in the main random access memory of a computer system, which is managed by the operating system. The SMR may be designed to work on any type of computer platform. The computer platform should preferably include at least one CPU, a writeable main memory (for example, volatile memory), and at least one operating system. The operating system should preferably support multi-processing (i.e., multiple processes running at the same time). Additionally, the operating system should preferably support shared memory management and inter-process message delivery.

Examples of compatible computer operating systems include Unix based systems (e.g., Sun Solaris, HP HPUX, SGI Irix, IBM Aix, etc.), Win32 compatible platforms (e.g., Windows 95/98, Windows NT and Windows NT Server), and Real-time embedded operating systems (e.g. QNX, manufactured by Cisco Systems of San Jose, Calif.).

Each SMR is writeable, and is configured to communicate with a secondary storage device residing at the secondary storage level of the stable storage system. The second level of the high performance stable storage system of the present invention includes "non-volatile", writeable memory which is able to preserve data even in the event of an operating system crash or a system power failure. Additionally, it is preferable that the second level memory device be configured to support atomic read/write operations. Examples of the second level memory include magnetic storage devices (e.g., hard disks, floppy, ZIP, etc.), writeable optical disks, magneto-optical disk storage systems, independently powered RAM disks, etc.

Another characteristic of at least one embodiment of the present invention is that the delay time for accessing data within the SMR is less than the delay time for accessing data within the secondary storage device/system. Additionally, in at least one embodiment, the access time for accessing any of the cells in the first level memory is substantially the same. Examples of memory types which may be used for implementing the first level stable storage include random access memory such as, SRAM, DRAM, ECC RAM, STDRAM, etc.

Typically, in most conventional networks or computer systems, memory is a constraining resource. This is particularly true in systems where virtual memory paging is not supported by imbedded real-time operation systems. Additionally, at least some conventional systems divide an application state into separate segments, which introduces either extra shared memory mapping costs (e.g., allocating pages) and/or extra management costs (e.g., multiple shared memory management overhead). As explained in greater detail below, the present invention overcomes these limitations by creating at least one contiguous memory region which uses boundary checking to reduce memory waste without sacrificing reliability.

Figure 3:
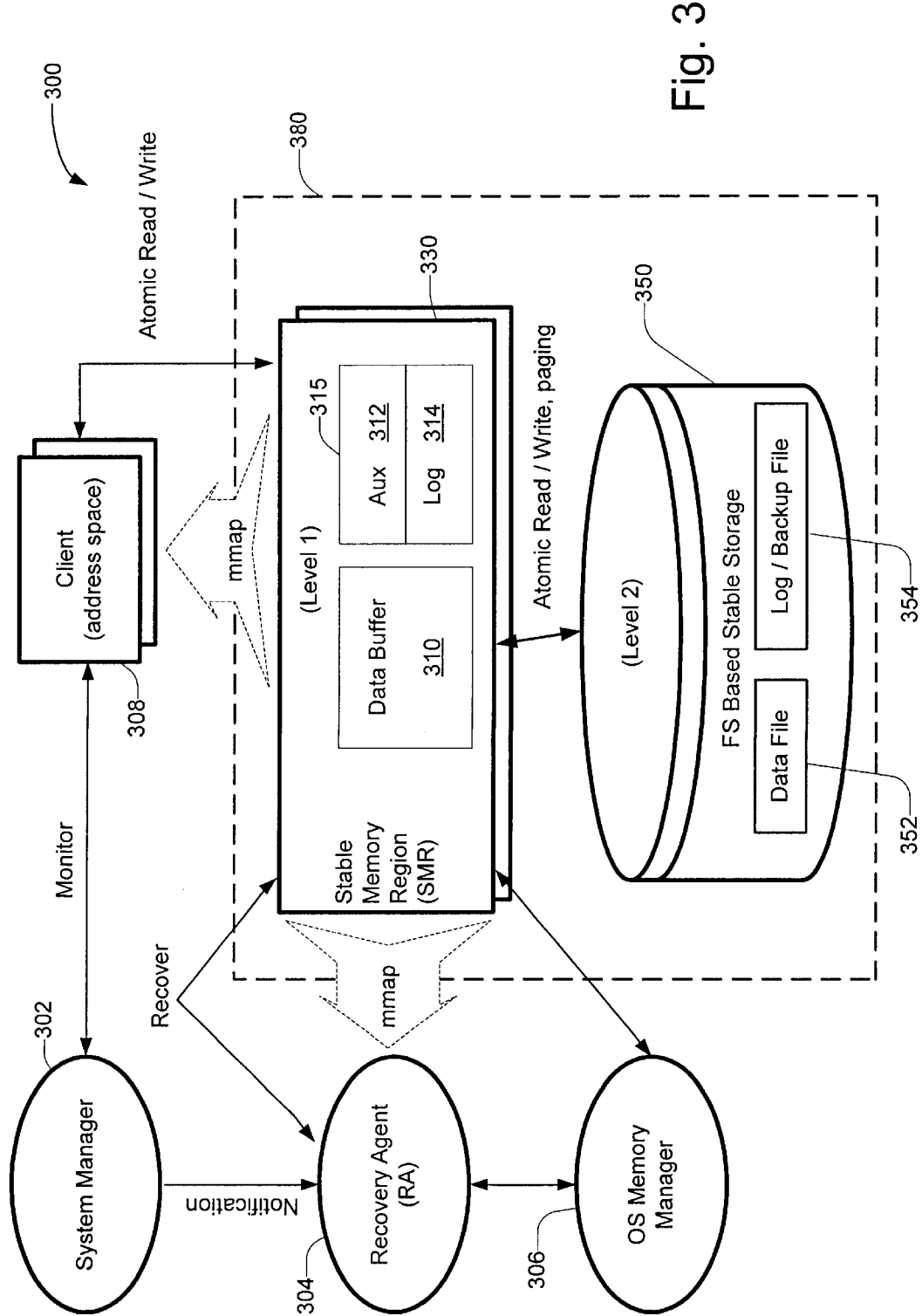
FIG. 3 shows a schematic block diagram of a specific embodiment of the high performance stable storage system of the present invention.

FIG. 3 shows a schematic block diagram of a specific embodiment of the high performance stable storage system 300 of the present invention. The first and second levels of stable storage are identified by block 380. Although not shown in FIG. 3, system 300 also includes at least one central processing unit (CPU) and at least one operating system. One or more client processes or applications 308 are configured to run on top of the operating system kernel. According to a specific embodiment of the present invention, all components or elements shown in FIG. 3, except for the second level storage device 350, run on the same CPU.

A system manager 302 continually monitors each client process and sends notification to the recovery agent 304 when it detects a client crash. When a client crash is detected, the system manager notifies the recovery agent that a particular SMR associated with the failed client should be recovered.

In a specific embodiment of the present invention, the recovery agent is a multi-threaded server process. Client processes and/or the system manager may send direct requests to the recovery agent for implementing a specific recovery agent procedure. A primary role of the recovery agent 304 is to recover SMR data upon notification from the system manager or from a client process. In this regard, one responsibility of the recovery agent (RA) is to roll back the data stored in an SMR to a consistent state using a log file. Additionally, the recovery agent maintains a current list of SMRs in the system or network. Further, the recovery agent may also destroy an SMR in response to a client process request.

The system of FIG. 3 includes an OS memory manager 306, which is part of the operating system. A primary function of the OS memory manager is to manage all shared memories within the system. This includes managing the stable storage memory regions of the present invention. Additionally, requests to create and/or release shared data blocks are also serviced by the memory manager 306. The system manager 302, recovery agent 304, and operating system work together to provide the high performance stable storage technique of the present invention.

A two-level stable storage hierarchy of system 300 is identified by block 380 of FIG. 3. The first level of stable storage hierarchy includes at least one stable memory region (SMR) 330. The second level of the stable storage hierarchy includes at least one "non-volatile" memory block 350. On most platforms, where processors and operating systems are much more reliable than applications, the first level of stable storage can boost the system availability and performance considerably while avoiding many of the performance penalties incurred by traditional stable storage systems. This performance gain is especially important for applications which perform fast incremental state updates or small transactions.

As shown in FIG. 3 the SMR comprises a plurality of shared memory blocks including a data structure 310, and a log structure 315 which includes a data log 314 and an auxiliary block 312. A detailed layout of these memory blocks is shown, for example, in FIG. 4 of the drawings.

Data structure 310 is used for storing client data or state fragment data related to a client process or application associated with a particular SMR. The actual data which is stored within data structure 310 of each respective SMR may be determined by each respective client or clients. Typically, the data stored within the SMR data structure 310 will be of the same type which is stored in conventional stable storage systems (described with respect to FIG. 1).

Log block 314 is responsible for maintaining a record of update transactions which take place during a single atomic transaction involving data structure 310. As described in greater detail below, the log 314 maintains a record of old data from the data structure which is being updated during a current atomic transaction (e.g. atomic WRITE operation). If a crash were to occur in the middle of an atomic update to the SMR data structure, the log 314 would contain the old state data of the data structure as it existed before the last atomic update. Using this information, the data within the SMR data structure may be rolled back to a consistent state as it existed before the crash occurred. The function of log block 314 is similar to the log which is used in conventional stable storage systems such as, for example, log block 108 of FIG. 1.

In order to ensure that the updating of the SMR data structure 310 is performed atomically, a log entry is created within log data portion 314 of the log 315 for every memory to memory data transfer operation between the client heap and the SMR data buffer relating to a particular atomic transaction. Any conventional log-recovery algorithm (e.g., the well-known write-ahead logging used in DBMSes) may be used for implementing the log entry procedure.

As explained in greater detail below with respect to FIG. 4, auxiliary block 312 may be utilized for a variety of purposes. One purpose is to resolve concurrency and reliability issues relating to multiple users or clients simultaneously accessing the SMR data structure 310.

In a specific embodiment of the present invention, SMR 330 of FIG. 3 may be configured or implemented to provide the following features. First, the SMR may be configured to provide an access interface which supports atomic access to its data structure 310. Implementation of the atomic access is achieved using auxiliary data structures (not shown) which are transparent to client processes. The meaning of "atomic" access is generally to one having ordinary skill in the art. Briefly, an atomic operation describes an operation that must be performed entirely or not at all. Atomic access operations which may be performed by the SMR include, for example, atomic Read operations, atomic Write operations, and atomic Flush operations.

A second property of SMR 330 is that the SMR is configured to support concurrent, high speed access of data within data structure 310 by multiple clients. As explained in greater detail below, additional hardware and/or software may be incorporated within the SMR or other parts of the stable storage system for managing concurrency and reliability issues.

One technique for implementing shared access of data within the SMR is to implement the SMR within the shared address space of the operating system. In this way, the SMR will be resilient to application failures, so that, if a client dies, the data contained within the SMR will still be accessible to other system elements.

Additionally, the SMR may be configured to share at least a portion of the same address space as a client process. Typically, each client process or application will have associated with it at least one respective SMR for storing that client's essential data. As described in greater detail below, the address of the associated SMR(s) is mapped into the client's address space. In this way, each SMR may share at least a portion of the same address space with its associated client process. One advantage in configuring the SMR in this manner is that the SMR is able to support direct memory to memory copying of data from the client heap into the SMR data structure 310.

An additional property of the SMR is that it may be configured to be byte-addressable in order to support incremental updating of state fragment data from the client heap to the SMR. Byte-addressability refers to the ability of a client to write data into the SMR data structure 310 directly using pointers. In contrast, traditional stable storage systems append the updated state fragment information to existing back-up files. In order to retrieve this new data appended to the end of the data file, the entire data file must be accessed sequentially, which involves a slow and undesirable process.

Because the SMR supports direct memory to memory transfer of data using pointers, the inherent delay for accessing desired memory locations within the SMR is greatly reduced compared to that of conventional stable storage systems. Thus, even if a conventional file system based stable storage system was configured to support incremental updates, the performance would still suffer because of inherent disk seeking delays.

Incremental updates refer to the ability to update a portion of the client data (e.g., updating selected fragments of application state data) within the data structure 310 of the SMR or the client heap. This feature is particularly advantageous in systems which require fast, incremental updating of state fragment data, and is particularly well suited for reducing check point overheads. For example, some network applications may desire to update a portion of their respective states (e.g., TCP packet sequence numbers) more frequently than other portions. Traditional stable storage systems do not provide natural support for incremental updating because of their inherent file system or double buffering implementations. The present invention addresses this issue by making this stable memory region byte addressable. In this way, the SMR is able to provide a fast, pointer-based data transfer capabilities to multiple clients at the same time. Such capabilities are not supported by conventional stable storage systems or conventional data cache mechanisms.

One way of viewing the dual level stable storage hierarchy is to think of the SMR as a high performance, fault resilient "cache" layer to a traditional file system-based stable storage systems (level 2). However, it will be appreciated that although the SMR of the present application may be described as providing a fault resilient "cache" layer to traditional file system based stable storage systems, the SMR includes a number of advantageous features which are not provided by conventional data caches. For example, a conventional data cache is not configured to support atomic access of data within the cache. Further, conventional data caches are not configured to support concurrent access for multiple clients. Moreover, conventional data caches are not configured to be resilient to application failures. Rather, a traditional data cache is typically held by an application and is configured to reside within the application program memory. In the event of an application or client crash, this data cache will typically be released. Additionally, a conventional data cache is not configured to support pointer-based data transfer. Rather, data transfer in conventional data caches which are accessible by multiple clients typically involves inter-process data copying, which is a relatively slow procedure involving the copying of data from one program memory space to another program memory space. Further, as commonly known to one having ordinary skill in the art, inter-process data copying cannot be implemented using a pointer-based data transfer process.

The second level 350 of the high performance storage hierarchy of the present invention may be any traditional file system-based stable storage system with the first level SMRs configured as the front end. Data contained within an SMR may be flushed into (and loaded from) second level stable storage 350 atomically upon an application request or by a request from the recovery agent. In this way, second level storage interacts with the first level SMRs much like virtual memory flushing and paging.

In a specific embodiment, the timing of expensive flushes to second level stable storage is under client control so that a client process can use its knowledge of its operations and environments to optimize performance. For example, based on the estimation of hardware and OS reliability, a client can decide when to flush the stable memory from an SMR into the second level stable storage. Alternatively, a client may choose to keep all of its data in SMRs if, for example, the underlying platform is reliable enough, or if the system is under heavy load and it is determined to be too expensive to flush the SMR data into second level stable storage. Alternatively, a client may choose to flush SMRs into second level stable storage at predetermined intervals, or at times when the system is under a relatively light load.

Figure 4:
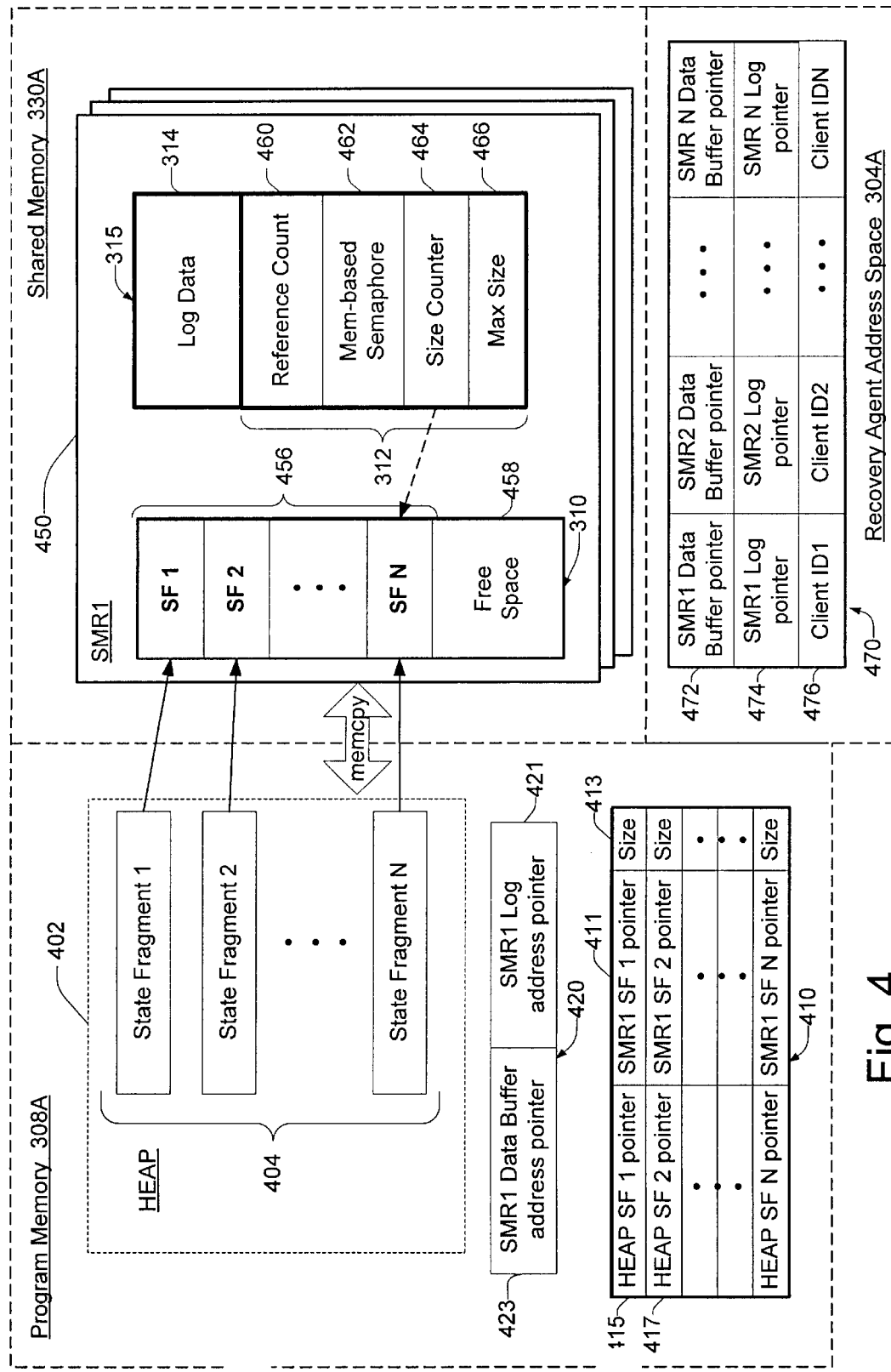
FIG. 4 shows a schematic block diagram of various data structures and memory blocks of a computer system which implements a specific embodiment of the high performance stable storage system of the present invention.

FIG. 4 shows a schematic block diagram of a specific embodiment of various memory blocks which form part of the stable storage system of the present invention. As shown in FIG. 4, SMR 450 (SMR 1) resides in a portion of shared memory managed by the operating system. This portion of shared memory is also shared by the client process or client application, thereby enabling direct memory to memory transfer of data between client heap 402 and SMR 450. Further, since SMR 450 resides within the OS shared memory, it is directly accessible by other clients or client applications built on top of the operation system. Accordingly, it is possible for multiple clients to concurrently access the data within SMR 450. Moreover, since the SMR resides within the OS shared memory, it is resilient to client application failures, meaning that the SMR will survive within the shared memory despite one or more client crashes.

In a specific embodiment of the present invention, the first several bytes of the SMR log block 315 are reserved for auxiliary data structures (312, FIG. 3). These data structures include a reference counter 460, a used buffer size counter 464, and a memory based semaphore 462. In an alternate embodiment, the auxiliary data structure 312 may include two copies of reference counter 460, and two copies of used buffer size counter 464, in order to increase reliability of the stable storage system.

Although multiple clients are able to concurrently access data within the SMR 450, it is preferable to provide exclusive write access for writing data into data structure 310. Accordingly, as shown in FIG. 4, a portion of memory within the SMR log 315 is reserved for concurrency control. These portions include a reference count block 460 which may be used to keep track of the total number of clients which are using or accessing a particular SMR. Additionally, a memory based semaphore 462 is used to provide exclusive access to the SMR.

In a specific embodiment, the memory-based semaphore is used to provide exclusive access to the SMR. However, it will be appreciated that any mutual exclusive primitive(s) provided by the underlying operating system may be used. One advantage of using a memory-based mutual exclusion mechanism is to allow the mechanism to be placed in the SMR itself, rather than having to remember which lock is needed to access a particular SMR. It will be appreciated, however, that alternative non-memory based mutual exclusion mechanisms may be used, such as, for example, a mutex mechanism.

In order to enhance reliability of the SMR, a size count field 464 is included within the SMR log 315 which may be used to keep track of the used space 456 within the SMR data buffer 310. Additionally, log 315 also includes a max size field 466, which indicates the maximum size of data buffer 310. By utilizing the size count field 464 and the max size field 466, one can then determine the amount of free space 458 available within data structure 310.

In the specific embodiment of FIG. 4, data structure 310 is implemented as a data buffer which stores state fragment data associated with a particular client application or process. Typically, data related to the client application will be stored within the client heap 402, which resides within the program memory 308A. The client heap 402 typically includes state fragment data 404, which may be separated into individual state fragments. State fragments 404 are typically implemented according to a user defined data structure within the code of the client application. The client process may choose to store any portion of state fragment data it desires into SMR 450. Thus, data buffer 310 may include selected portions of state fragment information from client heap 404.

The particular type of information stored within the SMR data structure 310 may vary depending upon the client application which uses the structure. For example, where the client process is a router application, the information which may be stored within the data structure 310 could be the number of packets processed by the router, the forwarding information based (FIB) state information, etc.

Each selected portion of state fragment information from client heap 404 will have a corresponding space allocated in data buffer 310 for storage of the associated state fragment data (456). Each state fragment 404 within the client heap may be of a different size or length. Accordingly, each data segment 456 within the data buffer may be of a different size or length which corresponds to its respective state fragment within client heap 402. Additionally, each state fragment of data within the client heap 402 may be of a predefined format which is specific to each individual client process. The size of each state fragment may be specified by the client, and may range, for example, from 4 bytes to 64 megabytes. For example, where the client process is a router application, the first 50 bits of heap 402 (corresponding to state fragment 1) may indicate the number of packets processed by the router. If desired, this information may be stored within a corresponding segment or region (e.g., SF1) of SMR data structure 310.

Also included within the client address space 308A is a pointer table 420 which points to the particular SMR (e.g., SMR 1) associated with that particular client application. This pointer table 420 may be referred to as an SMR "handle." Address table 420 includes a data buffer address pointer 423 which points to the data buffer 310 within SMR 450, and includes a log address pointer 421 which points to the log block 315 of SMR 450. In a specific embodiment, auxiliary block 312 and log block 315 are located in a continuous memory region. Since the size of the auxiliary block 312 is fixed, the location of log 314 can be computed (as a fixed offset) from a pointer which points to block log 315.

In the specific embodiment shown in FIG. 4, a fast, pointer-based data transfer technique is used for performing the direct memory to memory transfer of state fragment data from client heap 402 to the SMR data structure 310. The pointer-based data transfer technique is facilitated by a pointer table 410, which resides within the client address space 308A. Program variables (representing applications state fragments) which may be scattered throughout the client heap 402 are mapped into the SMR data buffer in contiguous regions. As shown in Table 410, the data structure of each state fragment includes a heap pointer 415 which points to a specific program variable or state fragment 404 within the client heap 402, and includes an SMR pointer 411 which points to the corresponding region within SMR data structure 310 for storing data corresponding to the particular state fragment identified by pointer 415. State fragment table 410 also includes a size field 413 describing the size of the corresponding program variable or state fragment. As explained in greater detail below, this size field 413 may be used to increase system reliability of SMR stable storage and to perform boundary checking. The SMR address pointer 411 will be initialized to NULL for new entries. Each portion of state fragment data 456 which is stored within data structure 310 will have a corresponding entry within state fragment table 410 which includes a respective heap address pointer 417, SMR address pointer 411, and size value 413. Because the heap address pointer and SMR address pointer are direct pointers, the SMRs are byte addressable.

Also shown in FIG. 4 is a recovery agent address space 304A. One of the responsibilities of the recover agent is to maintain the list of the current SMRs and associated clients within the system or network. Thus, in the specific embodiment shown in FIG. 4, the recovery agent address space 304A includes an SMR table 470. The SMR table 470 includes a respective SMR handle (i.e. SMR data buffer pointer 472 and SMR log pointer 474) for each SMR which resides within a shared memory 330A, and includes a client ID field (476) which identifies a primary client associated with each respective SMR in the system or network.

An SMR may be uniquely identified by a name defined by its associated client. For example, an SMR used by a TCP transport process might be named "/TCP SMR". When desired, a client may check to see if an SMR already exists under a particular name. For example, a client library may first call the OS to find out if a data buffer and a log already exists under a particular client name. If not (similar to a cache miss), the client contacts the second level stable storage system to check if a stable storage file exists under that particular name. If the stable file exists, the client loads the data from the second level storage atomically to thereby recreate an SMR having that particular name.

If there are no files within the second level stable storage having the particular name desired, the client may concluded that an SMR for that name does not exist. A client may then create a new SMR under that name, by using the client library to ask the OS to create the new SMR and map the two shared memory blocks (data buffer 310 and log 315) into the client address space. The OS will respond by providing the SMR handle of the new SMR (i.e. SMR address pointer table 420) within the client address space. The address of data buffer block 310 of the newly created SMR will be mapped into the data buffer address pointer 423, and the address of the log block 315 of the newly created SMR will be mapped into the SMR log address pointer 421. Additionally, the client may also instruct the recovery agent (RA) to map the newly created SMR into the recovery agent address space. The RA responds by requesting the OS to map the new SMR into the RA address space, and to insert the new SMR handle (i.e. SMR data buffer pointer, SMR log pointer) into table 470.

FIGS. 5–17 illustrate flow diagrams of various procedures related to the high performance stable storage system of the present invention. Some of the procedures of FIGS. 5–17 may be implemented as application programming interfaces (i.e., library interfaces) which are used by a client to manage one or more SMRs.

Figure 8:
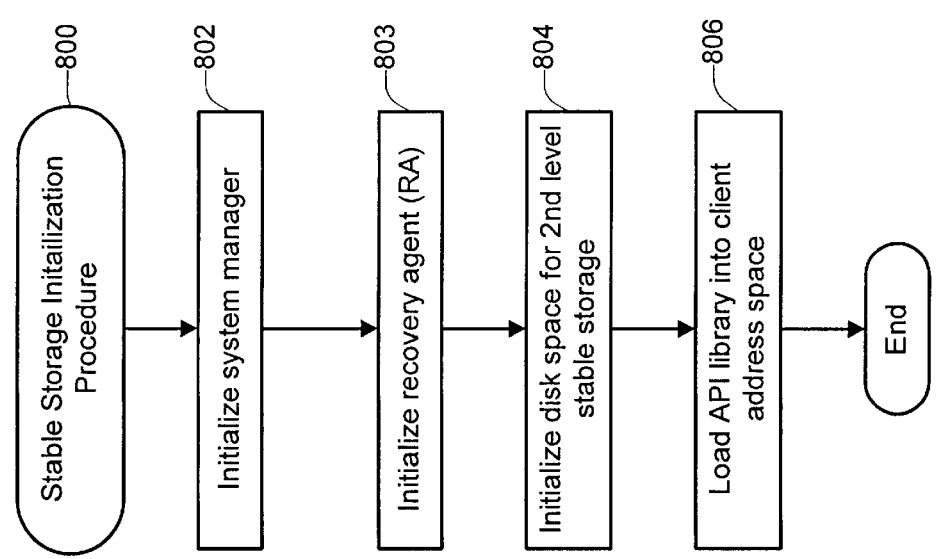
FIG. 8 shows a flow diagram of a specific embodiment of a Stable Storage Initialization Procedure 800 of the present invention.

FIG. 8 shows a flow diagram of a specific embodiment of the high performance stable storage initialization procedure 800 of the present invention. Procedure 800 may be evoked, for example, following a restart of the computer system or network. The stable storage initialization procedure 800 may be initiated by the operating system. The initialization procedure 800 includes initializing a system manager (802), initializing a recovery agent (803), and initializing disk space for second level stable storage (804). Additionally, an application programming interface (API) library is loaded (806) into the respective address space of each or selected clients running on top of the operation system As shown in FIG. 8, initialization procedure 800 includes initialization (803) of a recovery agent object. The procedure for initializing the recovery agent is described in further detail in a latter secion of this application with respect to FIG. 19.

Once the high performance stable storage system of the present invention has been initialized, the system manager, recovery agent, OS memory manager, and client processes may each run concurrently.

Figure 18:
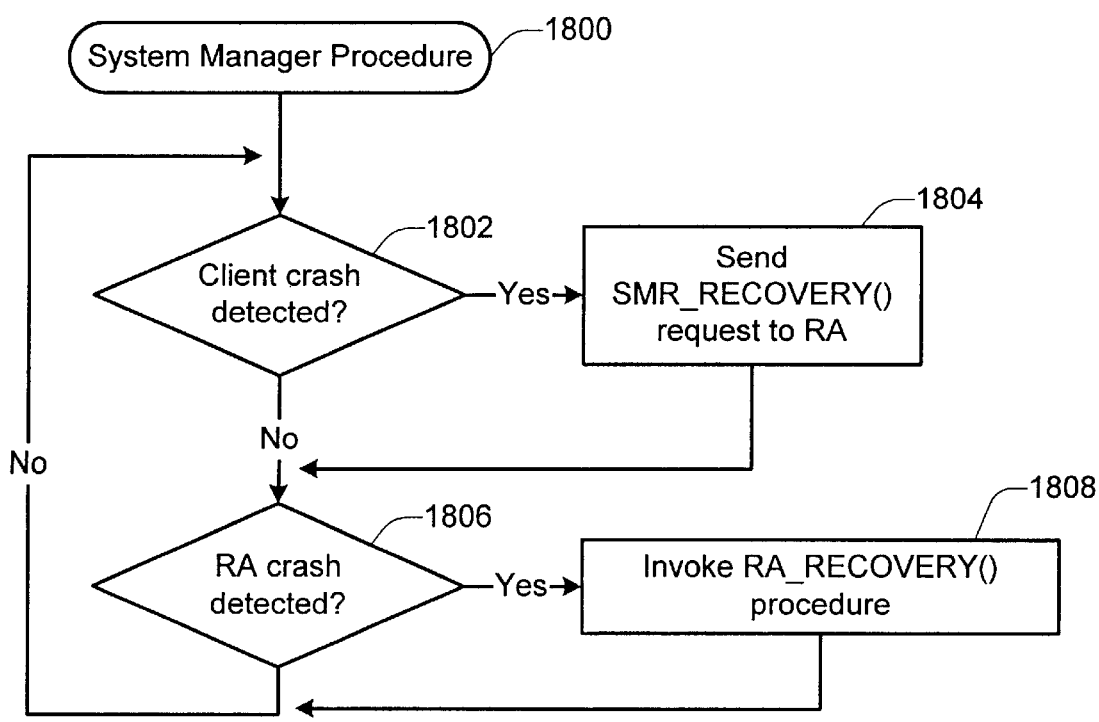
FIG. 18 shows a simplified flow diagram of system manager procedure 1800 according to a specific embodiment of the present invention.

FIG. 18 shows a simplified flow diagram of system manager procedure 1800 according to a specific embodiment of the present invention. Primary functions of the system manger are to monitor the client and RA processes, and detect client and/or RA crashes. If a client crash is detected (1802), the system manager notifies the recovery agent by sending an SMR_RECOVERY( ) request to the RA (1804). The SMR_RECOVERY( ) procedure is described in greater detail with respect to FIG. 16. If the system manager detects an RA crash (1806), it responds by invoking an RA_RECOVERY( ) procedure (1808). The RA_RECOVERY( ) procedure is described in greater detail below with respect to FIG. 20.

Figure 7:
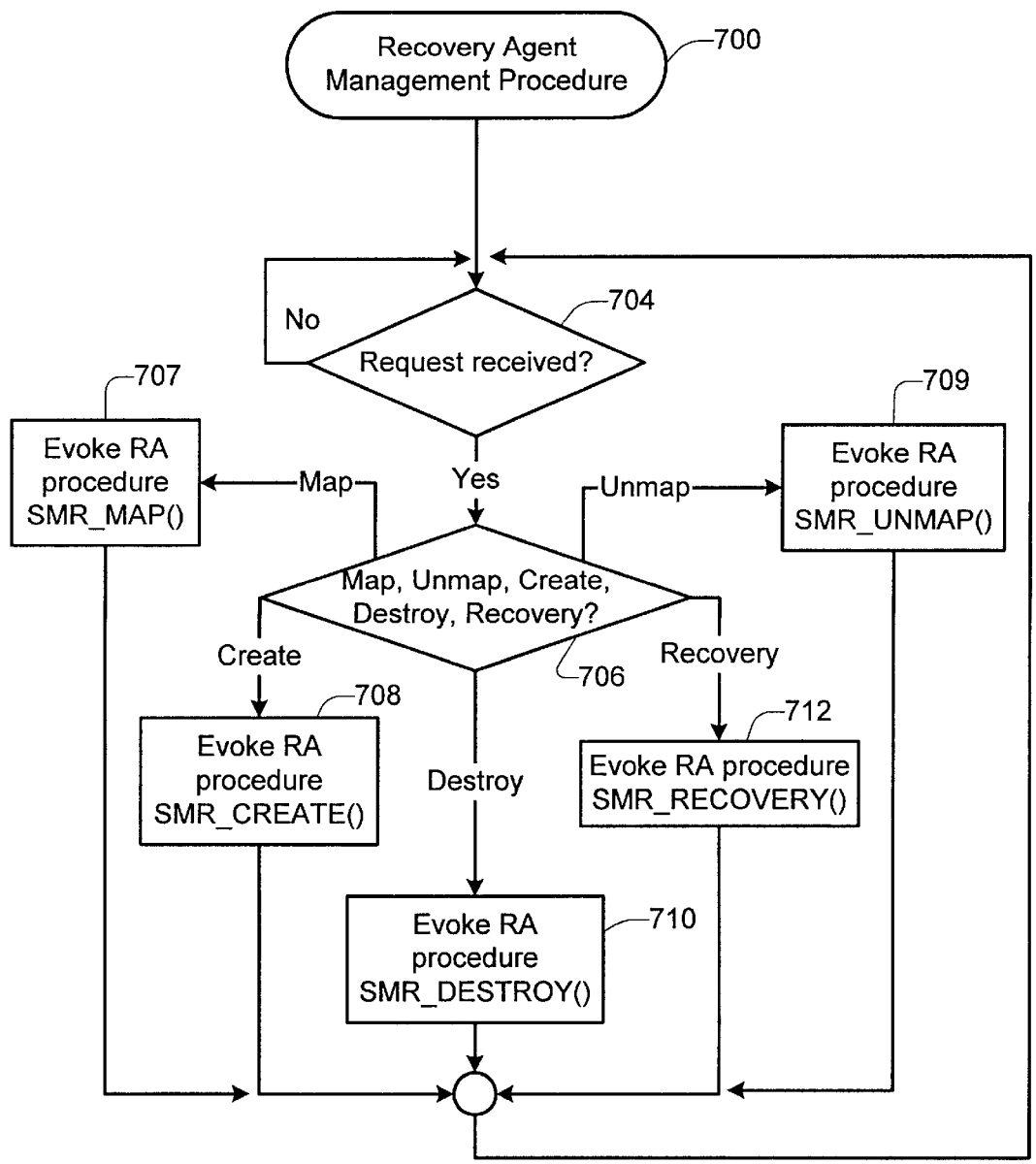
FIG. 7 shows a flow diagram of a specific embodiment of a Recovery Agent Management Procedure 700 of the present invention.

FIG. 7 shows a flow diagram of the recovery agent management procedure 700 in accordance with a specific embodiment of the present invention. Essentially, the recovery agent responds to requests which it receives from any one of the clients or the system manager. Thus, once the RA has been initialized (702), the RA then waits (704) for a request to be received. A received request will typically relate to an operation which is to be performed upon an SMR (in either the first level stable storage, second level stable storage, or both). If the received request relates to mapping an SMR, the RA invokes (707) an SMR_MAP( ) procedure, which is described in greater detail in FIG. 17A of the drawings. If the received request relates to unmapping an SMR, the RA invokes (709) an SMR_UNMAP( ) procedure, which is described in greater detail in FIG. 17B of the drawings. If the received request relates to creating an SMR, the RA invokes (708) an SMR_CREATE( ) procedure, which is described in greater detail in FIG. 14. If the received request relates to destroying an SMR, the RA invokes (710) an SMR_DESTROY( ) procedure, which is described in greater detail in FIG. 15 of the drawings. Alternatively, if the received request relates to recovering an SMR (which may be invoked, for example, in response to detection of a client crash), the RA responds by invoking (712) an SMR_RECOVERY( ) procedure, which is described in greater detail in FIG. 16 of the drawings. After the RA has responded to a particular received request, the RA management procedure returns to block 704, whereupon the RA waits for another request to be received.

Figure 6:
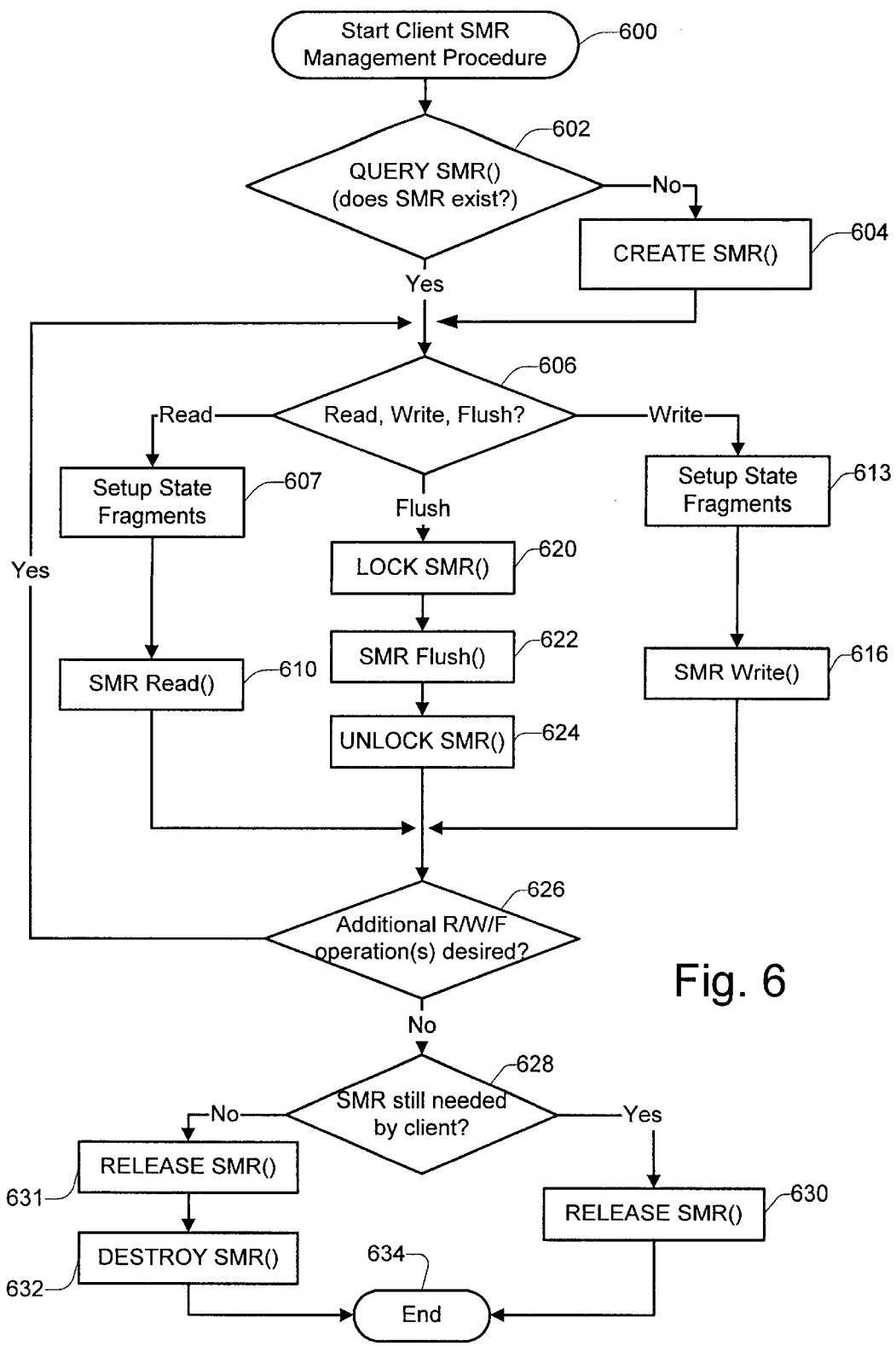
FIG. 6 shows a flow diagram of a specific embodiment of a Start Client SMR Management procedure 600 of the present invention.

FIG. 6 shows an example of flow diagram of a client SMR management procedure 600 in accordance with a specific embodiment of the present invention. As used in this application, the term "client" refers to any application or process which utilizes a stable storage system for storing at least a portion of its data. Each client is able to access the high performance stable storage system of the present invention using an API library, which is loaded into the client address space during initialization of the high performance stable storage system. The API library includes a plurality of commands which invoke different procedures for managing the SMRs. Individual APIs may implemented using the API library. A client can use an API in whatever way the client chooses. However, there are certain restrictions for appropriately using each API. For example, a client will first need to acquire an SMR handle (e.g. by calling CREATE SMR( )/QUERY SMR( )) before the client can call an SMR read, write, or flush operation. The example of FIG. 6 illustrates one appropriate way for using the API library. Generally, it is the application programmer's responsibility to use the API appropriately (e.g. by referencing sample code, documentation, etc.).

Each client process or application running on top of the operating system may evoke APIs in a manner described by the client SMR management procedure 600. This procedure may be used by each respective client process to manage one or more SMRs and the data contained therein. It will be appreciated that the flow diagram of FIG. 6 illustrates one example of how a client may utilize the various commands within the API library for managing the SMRs.

As shown in FIG. 6, a first event which may be implemented by the client process is to check to see if an SMR already exists under a particular name. To do this, the client executes a QUERY SMR( ) procedure which is shown, for example, in FIG. 5 of the drawings. A detailed description of the QUERY SMR( ) procedure is provided in a latter section of this application.

Generally speaking, however, when a QUERY SMR( ) procedure is initiated, the client library first calls the OS to find out if an SMR data buffer and an SMR log already exist under a particular name. If not (similar to a cache miss), the client contacts the second level stable storage system to check if a stable storage file exists under that particular name. If the stable file exists, the client asks the operating system to allocate shared memory blocks for a new SMR under that particular name, and atomically loads the data from the second level storage file into the newly recreated SMR. If there are not stable files in the second level stable storage system under the particular name desired, the client may assume that an SMR does not exist under that particular name.

Figure 9:
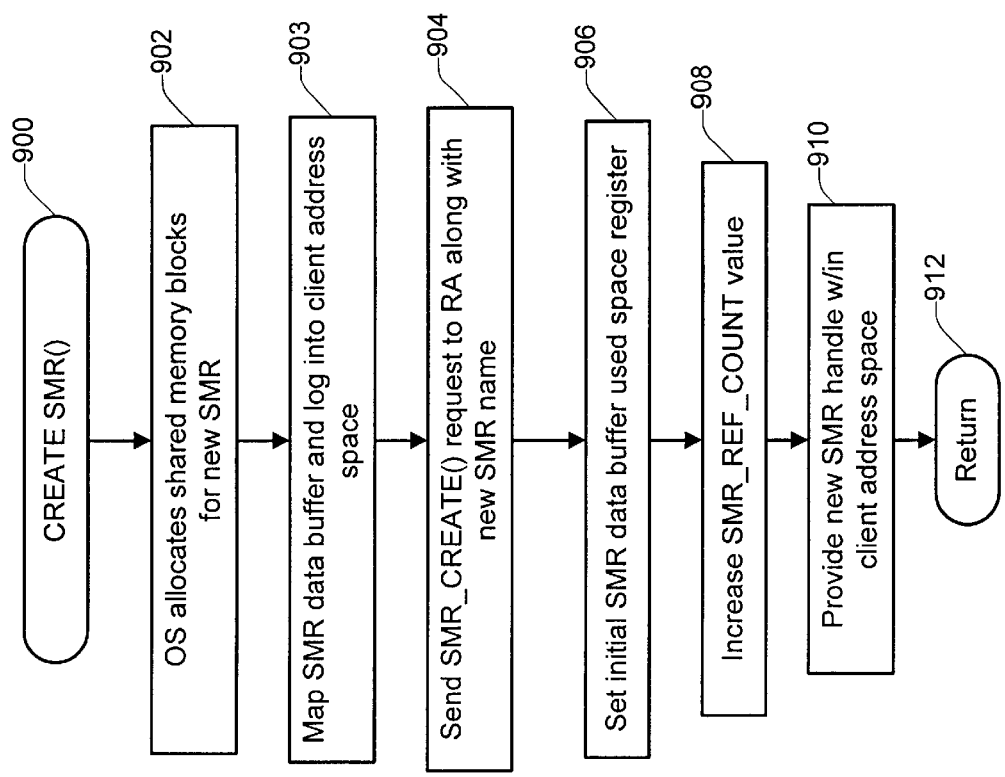
FIG. 9 shows a flow diagram of a specific embodiment of a Create SMR( ) Procedure 900 of the present invention.

Thus, returning to FIG. 6, if no SMRs exist for a particular name in either the first level stable storage or second level stable storage, the client may create a new SMR under the desired name by invoking a CREATE SMR( ) procedure (604). A specific embodiment of a flow diagram for the CREATE SMR( ) procedure is shown in FIG. 9 of the drawings. Generally, the CREATE SMR( ) procedure involves the client library asking the operating system to create a new SMR under a particular name, and to map the shared memory blocks of the new SMR into the client address space. The client also tells the recovery agent to map the new SMR into the RA address space so that the RA may be able to recover data related to this SMR at a later time. A more detailed description of the CREATE SMR( ) procedure 900 (FIG. 9) is provided in a latter section in this application.

Once the client process has acquired a desired SMR, it may then use that SMR as a stable storage device for storing any state fragment data which the client process deems appropriate. As used in this application, the term "state fragment" refers to any portion of data relating to a client process which may be stored within an SMR or second level stable storage device. As shown in block 606 of FIG. 6, a number of SMR-related procedures are available to the client process for managing data within the SMR. For example, the client process may choose to read data from the data from the SMR, write data to the SMR, flush data from the SMR into the second level stable storage, etc. It will be appreciated by one having ordinary skill in the art that the client library may include a plurality of other SMR-related commands (not shown) for managing the SMRs. The nature of such commands may vary depending upon the specific parameters of the stable storage system implemented and upon the specific parameters of the computer system or network. Such additional SMR-related procedures may be implemented in the high performance stable storage system of the present invention by one having ordinary skill in the art.

After a particular SMR has been mapped into the address space of a client process, that client process may then perform a number of operations for managing the SMR and the data contained therein. The client may use an SMR handle to evoke the SMR access API. When a client process desires to implement a specific SMR-related procedure, it makes a call to the API library to initiate the desired procedure. For example, referring to FIG. 6, if the client process wishes to read a selected portion of data from the SMR, it first sets up an entry list (607) specifying the location(s) of the data (e.g., state fragments) within the SMR which is to be read, and then makes an SMR READ( ) call request (610) to the API library, passing the entry list of state fragments along with the SMR READ( ) request. The API library then executes the specified SMR READ( ) request.

When a particular state fragment is included in the entry list for reading and/or writing, its heap address pointer, SMR address pointer, and size are included within that entry. The SMR access API may be invoked, for example, by making either a SMR READ( ) or a SMR WRITE( ) call to the API library, while simultaneously passing the SMR handle and entry list as input parameters.

Referring to FIG. 6, for example, if the client process wishes to retrieve data from the SMR data buffer into the client heap, it may set-up (607) an entry list which includes a description of the particular state fragment data to be transferred and send (610) an SMR READ( ) request (610) to the API library. Alternatively, if the client process wishes to transfer one or more state fragments from the client heap into the SMR data buffer, it will set-up (613) an entry list describing the particular state fragment(s) to be transferred and send (616) an SMR WRITE( ) request to the API library.

The client is able to define the transaction boundaries of an atomic operation (e.g., read, write, flush, etc.) involving an SMR. These transaction boundaries may include, for example, multiple state fragment updates within a single atomic operation. Each of the state fragment updates are included as individual entries in an enrty list for that particular atomic transaction. Thus, in a specific embodiment, all entries in each entry list are committed in the same atomic transaction. In every atomic transaction, entries within the entry list will be copied (MEMCPY) into (or from) the SMR data buffer in order, and the accumulated size will be checked against the size of the SMR data buffer. A client may compose an entry list dynamically in order to perform incremental updates. An incremental update is essentially a small memory to memory copy of a portion of data (e.g., state fragment) at a specific location. For example, by writing a single entry within an entry list, a client is able to update a small portion of its state. During a write operation, a NULL SMR pointer address in an entry signifies that a new state fragment region must be allocated within the SMR data buffer. The SMR performs boundary checking by comparing the size of the free space in the SMR data buffer with the size of the new state fragment. In this way, it is possible for a client to atomically update its entire state (comprising a plurality of state fragments), or to atomically update only desired portions of its state at any given time.

In order to ensure that updating is performed atomically, a log entry is created in the SMR log for each memory to memory data transfer between the client heap and the SMR data buffer. Thus, for example, during a single update transaction using an entry list which includes a plurality of entries, a respective log entry will be created for each element in the entry list as that particular state fragment is updated. Each log entry will include the old data of the respective state fragment which is being updated with new data. After all of the state fragments in the entry list have been updated, all log entries which were generated during that write transaction are deleted. Accordingly, if any atomic transaction is successful, there should be no log entries which remain in the SMR log. However, if a failure occurs during the atomic update transaction, for example, a log record will exist for the state fragments which were updated within the SMR data buffer during the last update transaction, before the crash occurred. Using the old data within the log file, the identified state fragments may be restored to their previous values (which existed before the failed atomic transaction) using the old state fragment data contained within the log. Any log-recovery algorithm (such as the popular write-ahead logging used in DBMs) may be used. This recover process is described in greater detail in a latter section of this application.

As shown in FIG. 6, a client process may also chose to flush the contents of the first level SMR into second level stable storage by sending an SMR FLUSH( ) request (622) to the API library. The SMR FLUSH( ) operation is described in greater detail with respect to FIG. 10 of the drawings. During an SMR FLUSH( ) or SMR WRITE( ) operation, it is preferable that these particular SMR being acted upon be locked in order to provide exclusive access to the SMR. As will be appreciated by one having ordinary skill in the art, a memory based semaphore (462, FIG. 4) may be used for providing exclusive access to the SMR.

In a specific embodiment, the data transfer between the SMR and second level storage is handled by the second level storage implementation. It will be appreciated by one having ordinary skill in the art that there are a variety of commonly known techniques for implementing second level stable storage. Since these techniques are well-known in the art, a more detailed description of their respective implementations will not be presented in the present application.

Once an SMR has been mapped into the client address space, that client is able to use the SMR for as long as it needs, or until a system crash occurs. During the time that a particular client process is using an SMR, the client may invoke any number of desired calls from the API library for managing/accessing the SMR and data contained therein. Thus, for example, at 626, the client may perform multiple read/write/flush operations upon the SMR, as desired.

After the client process has finished accessing (e.g. read, write. flush, etc.) a specified SMR, it then makes a determination (628) as to whether it still needs the SMR for future reference/use. If it is determined that the SMR is needed for future use, the SMR may be released (630) by invoking a RELEASE SMR( ) call (see, e.g., FIG. 12) in order to conserve system resources. If the client process subsequently desires to again access the SMR, it may re-attach the SMR utilizing the QUERY SMR( ) procedure (FIG. 5).

If, however, it is determined that the SMR is not needed for future use, the SMR is released (631) by invoking a RELEASE SMR( ) call. Thereafter, the SMR may be destroyed (632) by invoking a DESTROY SMR( ) call. Before destroying the SMR, however, the RA checks to see if the SMR is currently being used by at least one other client. If so, the SMR is not destroyed. This process is described in greater detail with respect to FIG. 15 of the drawings.

Figure 5:
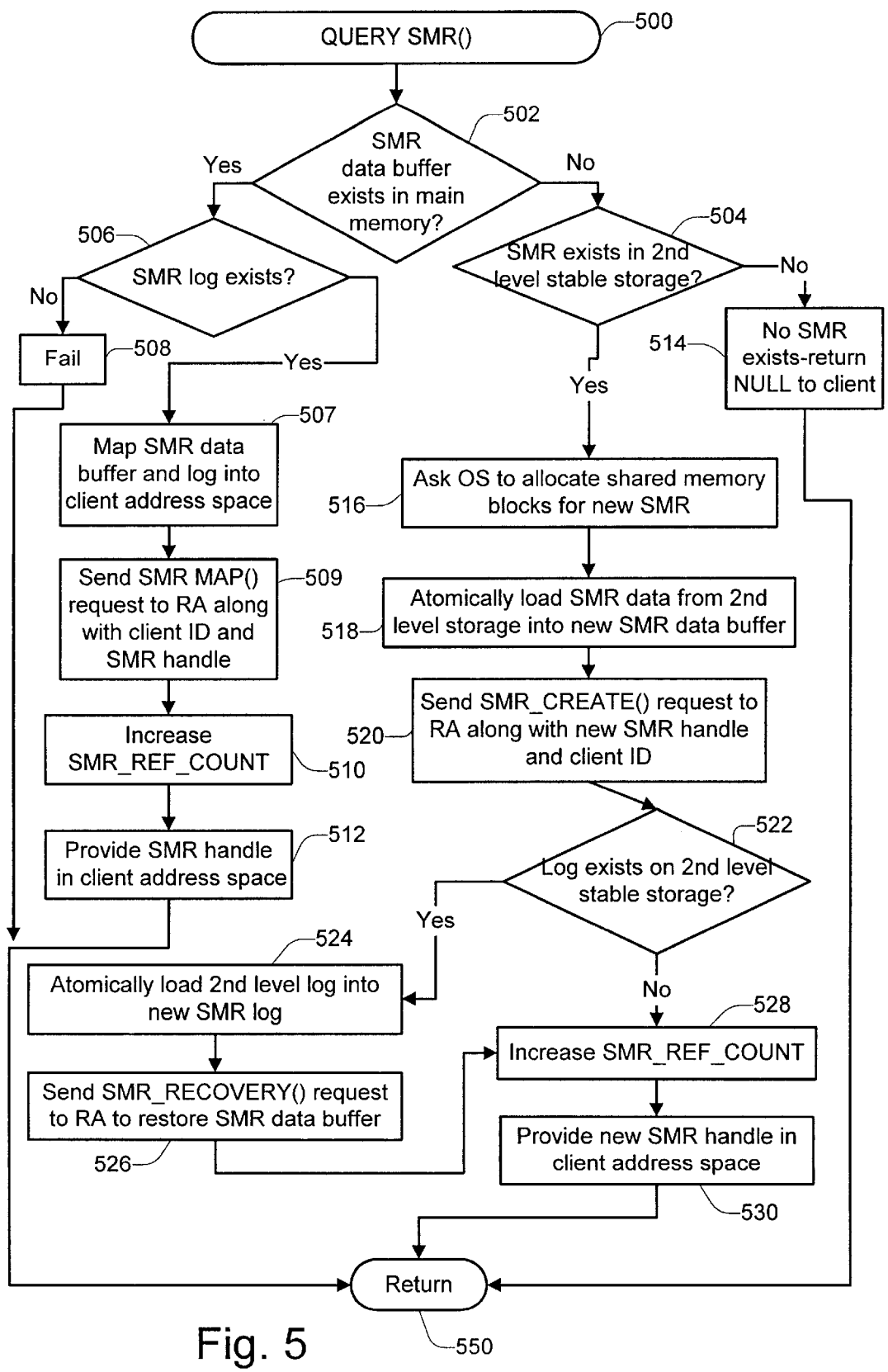
FIG. 5 shows a flow diagram of a specific embodiment of a Query SMR( ) procedure 500.

FIG. 5 shows a flow diagram of a specific embodiment of the present invention for implementing a QUERY SMR( ) procedure 500. The QUERY SMR( ) procedure 500 may be evoked, for example, by the client SMR management procedure (e.g., 602, FIG. 6). Essentially, the QUERY SMR( ) procedure 500 checks to see if an SMR exists under a particular name. The name may be specified as an input parameter to the QUERY SMR( ) call request. The flow diagram of FIG. 5 will now be described in greater detail, with reference to FIG. 4 of the drawings.

At 502, a determination is made whether an SMR data buffer having a specified name (the name being specified by an input parameter to the call request) exists within the main memory. In a specific embodiment of the present invention, this determination is made by the OS memory manager (306, FIG. 3). If it is determined that an SMR data buffer for a specified name exists within the main memory, the OS then checks to see if an associated SMR log exists under the specified name (506). If it is determined that the SMR log does not exist, the QUERY SMR( ) procedure returns a failure or error message (508).

If both the SMR data buffer and SMR log for a specified name exists within the main memory, then the SMR data buffer and SMR log are mapped (507) into the client address space. An entry including the SMR handle and associated client ID is also inserted (509) into the RA's SMR list (e.g. table 470, FIG. 4) by sending an SMR_MAP( ) request to the RA. At 510, the value of the reference count variable (460, FIG. 4) is incremented to indicate that an additional client is using or accessing the specified SMR. At 512, the SMR handle for the specified SMR is returned to the client and provided within the client address space. In a specific embodiment of the present invention, the SMR handle includes an address pointer to the specified SMR data buffer 310 and an address pointer to the specified SMR log 315, and is represented, for example by SMR pointer table 420 of FIG. 4.

If the OS determines that a specified SMR data buffer does not exist within the main memory, at 504, the second level stable storage system is consulted to determine whether a file related to the specified SMR exists within the second level stable storage memory. If it is determined that no file relating to the specified SMR exists within the second level stable storage system, at 514, a NULL value is returned to the client.

If, however, a file relating the specified SMR is found to exist within the second level stable storage, at 516, the OS allocates (516) shared memory blocks within the main memory for implementing a new instance of the specified SMR within the main memory. The new shared memory blocks allocated for the specified SMR will include a shared memory block for the new SMR data buffer, and a shared memory block for the new SMR log. At 518, data from the specified SMR file within the second level stable storage is atomically loaded into the newly allocated SMR data buffer residing within the first level table storage. The recovery agent is then notified of the new SMR by invoking an SMR_CREATE( ) call request (520), passing the handle of the new SMR and identity of the associated client as input parameters.

A flow diagram of a specific embodiment of the SMR_ CREATE( ) procedure 1400 is shown, for example, in FIG. 14 of the drawings. The SMR_CREATE( ) procedure may be called, for example, by the RA management procedure as illustrated in FIG. 7. During the SMR_CREATE( ) procedure, the OS maps (1402) the newly allocated SMR into the address space of the recovery agent, and uses the SMR_MAP( ) procedure (FIG. 17A) to add (1404) the new SMR handle and associated client ID into the recovery agent's list of SMR handles. A specific embodiment of the recovery agent's list of SMR handles is represented by table 470 of FIG. 4, and includes a first pointer field (472) having an entry which points to the newly allocated SMR data buffer, a second pointer field (474) having an entry which points to the newly allocated SMR log, and a third field (476) which contains the names or identities of the clients associated with each respective SMR handle.

Returning to FIG. 5, once the new SMR has been mapped into the recovery agent address space, at 522, a second level stable storage is consulted to determine whether a log file exists relating to the specified SMR. If a log file relating to the specified SMR is found to exist within the second level stable storage, it is possible that an SMR was flushed from the first level stable storage into the second level stable storage in response to detection of a client crash, which may have occurred while the client was updating state fragments within the specified SMR. Typically, a successfully completed atomic transaction would not have a corresponding log entry since all of the log entries generated during a single atomic transaction are deleted upon successful completion of the atomic transaction. Accordingly, when a log file for an SMR is found to exist within the second level stable storage, the data contained within the log file is recovered and restored to its appropriate place within the SMR data buffer. Thus, at 524, information from the SMR log file located within the second level stable storage is atomically loaded into the newly allocated SMR log residing within the first level stable storage. An SMR_RECOVERY( ) request is then sent (526) to the recovery agent to restore the new SMR data buffer to a consistent state using the information contained within the new SMR log. A specific embodiment of a flow diagram for the SMR_RECOVERY( ) procedure 1600 is shown, for example, in FIG. 16 of the drawings, and is described in greater detail in a latter section of this application.

After the SMR data buffer has been restored to a consistent state using the SMR log, or, in the alternative, if a log file related to the SMR is not found to exist within the second level stable storage, at 528, the SMR reference counter (460, FIG. 4) is incremented to indicate the addition of a new client which is using or accessing the SMR. At 530, the new SMR handle is provided within the address space of the client which called the QUERY SMR( ) procedure 500.

FIG. 9 show a flow diagram of a CREATE SMR( ) procedure 900 of the present invention. The CREATE SMR( ) procedure may be invoked by a client wishing to create a new SMR within the first level stable storage (e.g., main memory). Input parameters to the CREATE SMR( ) procedure may include a name value or string to be associated with the SMR and a size value specifying the desired memory size of the SMR by the client. The CREATE SMR( ) procedure 900 may be called using the client API library.

At 902, the OS is asked to allocate shared memory blocks for the new SMR, including a first shared memory block for the new SMR data buffer and a second shared memory block for the new SMR log. The new SMR data buffer and SMR log are then mapped into the client address space (903). Next, the RA is notified of the new SMR by sending an SMR_CREATE( ) request to the RA along with the new SMR name (904). As described previously, the RA will respond by causing the new SMR to be mapped into its address space, and will also insert the new SMR handle into the RA's list of current SMR handles.

Next, at 906, the used space register (464, FIG. 4) of the SMR log is initialized. This register is used to keep track of the total amount of space currently used within the SMR data buffer for storing state fragment data related to a client process.

Next, at 908, the SMR reference counter (460, FIG. 4) is incremented to keep track of the total number of clients accessing that specific SMR. Thus, for example, after a new SMR has been created at the request of a client, and the SMR has been mapped into the client address space and into the recovery agent address space, the SMR reference counter 460 (FIG. 4) should have a value of two, representing the client and recovery agent. For each additional client which maps the SMR to its address space, the SMR reference counter will be incremented by one.

Returning to FIG. 9, at 910, the new SMR handle is returned to the client which initiated the CREATE SMR( ) procedure, and provided within that client's address space.

It will be appreciated that, conventionally, shared memory is mapped in pages (typically four or eight KB). However, the size of the data buffer in an SMR may be specified by the client. For example, the client may make a request for an allocation of 350 bytes to store its state data. In order to avoid memory waste, a specific embodiment of the present invention allocates data buffers based on the exact size specified by the client (e.g., 350 bytes instead of one page). Thus, when the data buffer is mapped into a client address space, additional memory regions may be mapped into the client address space which are adjacent to the data buffer for the log. To make sure that the client does not corrupt these additional memory regions, the present invention is configured such that the client accesses the data buffer through an access API which performs implicit size boundary checking. This boundary checking induces very little performance overhead since (as explained below) the size of each update to an SMR is explicitly specified in a particular update request. If a client writes to an address outside of the data buffer, the write request will be aborted.

Figure 10:
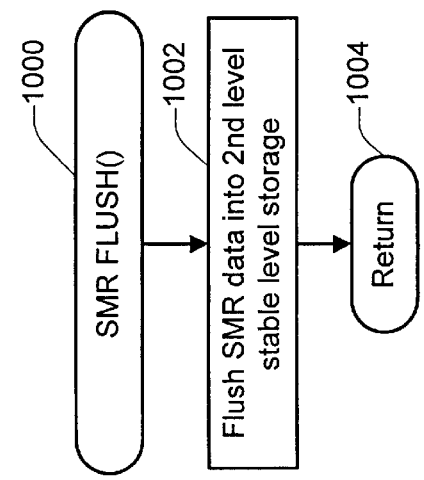
FIG. 10 shows a flow diagram of a specific embodiment of a SMR Flush( ) Procedure 1000 of the present invention.

FIG. 10 illustrates a flow diagram of a SMR FLUSH( ) procedure 1000 in accordance with a specific embodiment of the present invention. The SMR FLUSH( ) procedure may be evoked by a client process for atomically flushing contents of a specified SMR data buffer into the second level stable storage system. In this way a client process can use its knowledge of its operations and environments to optimize system performance. For example, based on the estimation of hardware and OS reliability, a client can decide when to flush the stable memory from an SMR into the second level stable storage. Alternatively, a client may choose to keep all of its data in SMRs if, for example, the underlying platform is reliable enough, or if the system is under heavy load and it is determined to be too expensive to flush the SMR data into second level stable storage. Alternatively, a client may choose to flush SMRs into second level stable storage at predetermined intervals, or at times when the system is under a relatively light load. The SMR FLUSH( ) procedure may be called by a client process as shown, for example, in FIG. 6 of the drawings.

Figure 11:
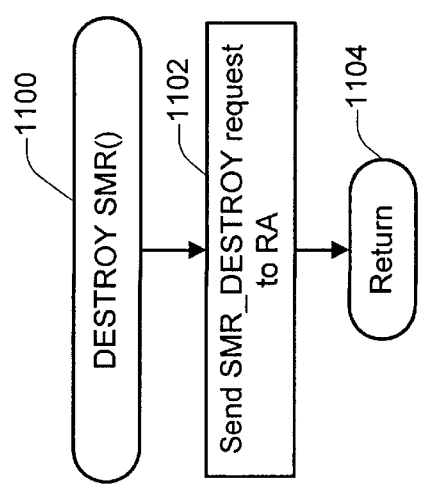
FIG. 11 shows a flow diagram of a specific embodiment of a Destroy SMR( ) Procedure 1100 of the present invention.

FIG. 11 shows a flow diagram of a DESTROY SMR( ) procedure 1100 in accordance with a specific embodiment of the present invention. The DESTROY SMR ( ) procedure may be called by a client process as shown, for example, in FIG. 6. The name of the SMR may be passed as an input parameter to the DESTROY SMR request. When evoked, the DESTROY SMR( ) procedure sends an SMR_DESTROY( ) request (1102) to the recovery agent. A flow diagram of the SMR_DESTROY( ) procedure is shown, for example, in FIG. 15 of the drawings.

Referring to FIG. 15, when the recovery agent receives an SMR_DESTROY request, it will receive the name of the particular SMR targeted for destruction as an input parameter. The RA then selects the identified SMR (1502) from the RA's SMR handle list (470, FIG. 4), and checks to see if the SMR is currently being used by one or more client processes (1504) by consulting the SMR reference counter (460, FIG. 4). In a specific embodiment, the SMR may be destroyed if the reference counter value is equal to one, meaning that all clients have released the specified SMR and only the RA has access to the SMR.

If the identified SMR is being used by at least one client process, then, at 1516, procedure 1500 returns a failure error message. However, if the identified SMR is not being used by any client process, at 1506, an SMR_UNMAP( ) procedure is initiated by the RA to remove the associated SMR entry (i.e. SMR handle and client ID) from the RA list (e.g. SMR pointer table 470, FIG. 4). The RA also instructs the OS to unmap the SMR from the RA's address space (1508); instructs the OS to free the memory blocks associated with the identified SMR (1510); and request the second level stable storage to destroy any existing file within the second level storage device related to the identified SMR (1512). The SMR_DESTROY( ) procedure may be called, for example, by the RA management procedure as illustrated in FIG. 7.

Figure 12:
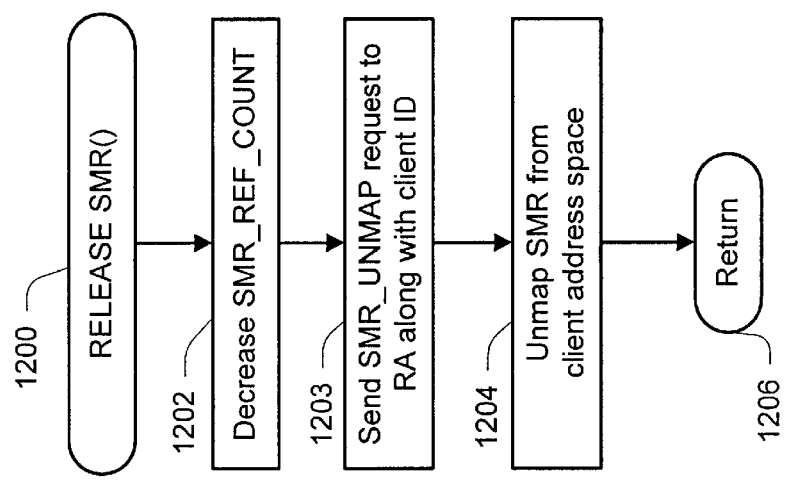
FIG. 12 shows a flow diagram of a specific embodiment of a Release SMR( ) Procedure 1200 of the present invention.

FIG. 12 shows a flow diagram of a specific embodiment of the RELEASE SMR( ) procedure 1200. This procedure may be evoked by a client process as shown, for example, in FIG. 6 of the drawings. When an SMR is released by a client process, the SMR reference counter is decremented (1202), and an SMR_UNMAP( ) request is sent to the RA to remove the associated SMR entry from the RA's SMR list (e.g. Pointer table 470, FIG. 4). Additionally, the SMR is unmapped (1204) from the address space of the client requesting release of the SMR. The RELEASE SMR( ) procedure should preferably not affect other client processes concurrently accessing or using the released SMR.

Figure 13A:
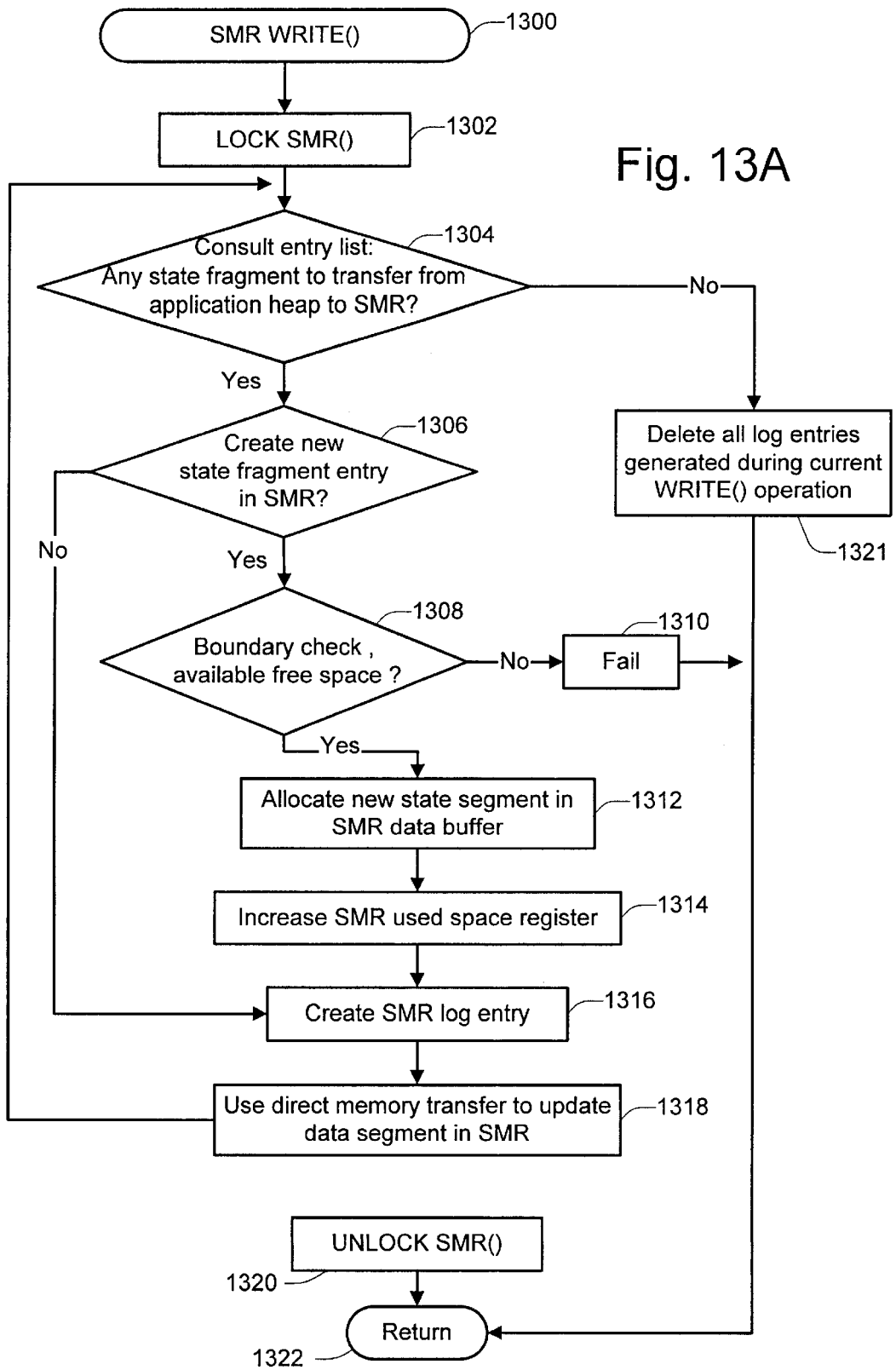
FIG. 13A shows a flow diagram of a specific embodiment of an SMR Write( ) Procedure 1300 of the present invention.

FIG. 13A shows a flow diagram of an SMR WRITE( ) procedure 1300 in accordance with a specific embodiment of the present invention. The SMR WRITE( ) procedure may be evoked by a client process as shown, for example, in FIG. 6 of the drawings. The SMR WRITE( ) procedure may be used for transferring data from a client heap into the SMR data buffer. Before the write operation commences, the specified SMR is locked (1302) in order to provide exclusive access to the SMR data structure by the client process evoking the SMR WRITE( ) procedure.

As described previously with respect to FIG. 6, a state fragment entry list is included as an input parameter to the SMR WRITE( ) request. The entry list includes a description of one or more state fragments within the SMR data buffer which are to be written to. At 1304, this entry list is consulted, and a specific entry is selected for processing. If the selected entry corresponds to a new state fragment entry within the SMR data buffer (1306), boundary checking is performed (1308) to make sure that the new state fragment data will be written to an address within the SMR data buffer and to make sure that there is sufficient free space in the SMR data buffer for receiving the entirety of the data related to the new state fragment. If either or both of the above criteria can not be satisfied, a failure message will be returned (1310), and the SMR unlocked (1320).

If the boundary check and available free space conditions are satisfied, then a new state segment is allocated (1312) within the SMR data buffer for storing data related to the new state fragment entry. Additionally, the used space register (464, FIG. 4) is updated (1314, FIG. 14) to reflect the additional memory space used for storing data related to the new state fragment entry.

Before data is actually written into the SMR data structure, an SMR log entry relating to a selected state fragment is created (1316) within the SMR log. Each log entry (corresponding, e.g., to the update of one state fragment) includes a pointer to the head of the corresponding state fragment segment (e,g, SFx) within data buffer 310, a copy of the old state fragment data (i.e. the most recent state fragment data which existed within the SMR data buffer before that data segment was written over with new data), and the size of the state fragment. As explained in greater detail below, the information contained within each log entry may be used to restore the SMR data buffer to a consistent state following a system or client crash.

After an entry has been made within the SMR log corresponding to a selected state fragment entry within the entry list, the identified state fragment data from the client heap is transferred to its corresponding segment within the SMR data buffer using a direct memory to memory transfer technique (1318).

After a selected data segment within the SMR data buffer (corresponding to a selected state fragment entry within the entry list) has been updated, the SMR WRITE( ) procedure returns to block 1304, whereupon any additional entries within the entry list are processed in the same manner as described above.

Once all of the entries within the entry list have been processed and the identified segments of the SMR data buffer updated, the atomic write operation may be treated as being successfully completed. Accordingly, at 1321, all log entries within the SMR log which were generated during the current SMR WRITE( ) transaction are deleted, since the atomic write operation has been successfully completed. Thereafter, at 1320, the SMR is unlocked so as to permit concurrent access of the updated data within the SMR data structure.

Figure 13B:
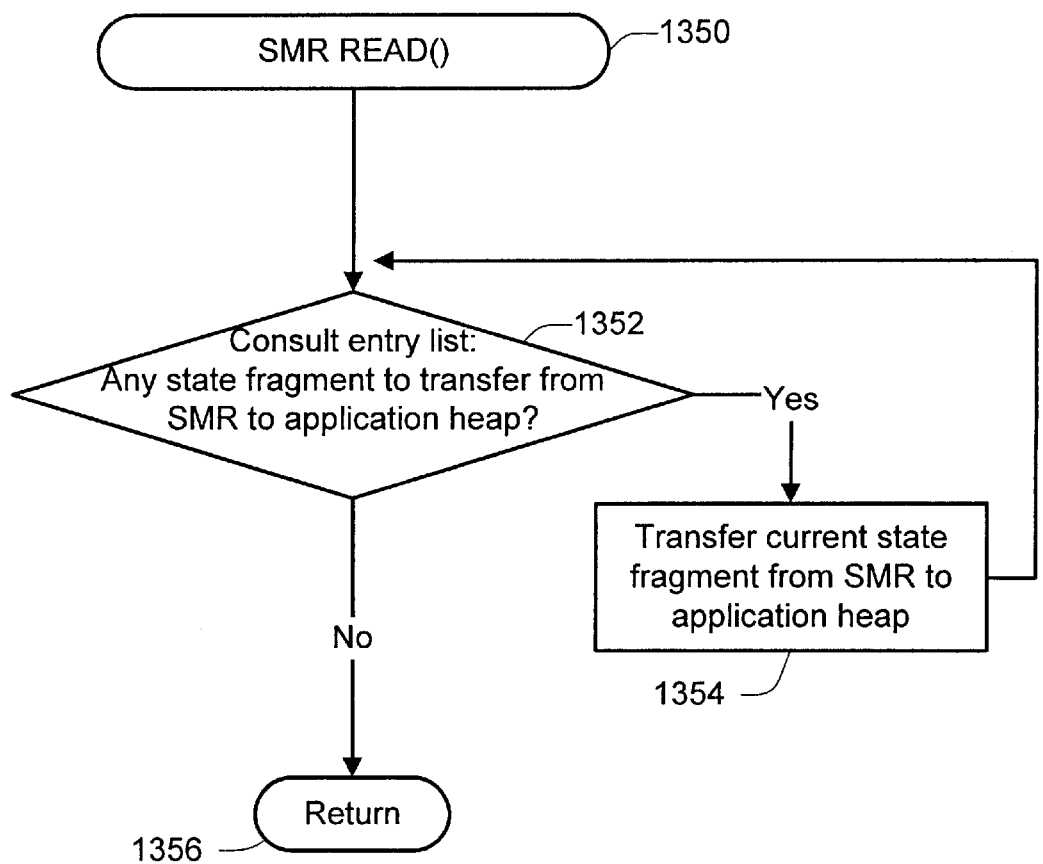
FIG. 13B shows a flow diagram of a specific embodiment of an SMR Read( ) Procedure 1350 of the present invention.

FIG. 13B shows a flow diagram of a specific embodiment of an SMR READ( ) procedure 1350. The SMR READ( ) procedure may be evoked by a client process as shown, for example, in FIG. 6 of the drawings. When the OS receives the SMR READ( ) command, it consults the entry list to determine which state fragments to transfer from the SMR to the client heap (1352). The OS then transfers data relating to each of the state fragments within the entry list from the SMR data buffer 310 to the client heap 402 (1354). In a specific embodiment, this data transfer operation is performed atomically, wherein all of the items within the entry list are treated as a single transaction. In alternate embodiment of the present invention, however, the data transfer from the SMR to the application heap may not be performed atomically. After all of the items within the entry list have been serviced, flow control is returned (1356) to the procedure which called the SMR READ( ) process.

FIG. 16 shows a flow diagram of an SMR_RECOVERY( ) procedure 1600 in accordance with a specific embodiment of the present invention. The SMR_RECOVERY( ) procedure may be evoked, for example, by the RA management procedure described in FIG. 7.

As commonly known to one having ordinary skill in the art, POSIX shared memories are persistent. Thus, if a client crashes while it is writing to the SMR data buffer, the SMR data buffer and log will still be accessible to the recovery agent. When the system manager notifies the recovery agent of the client crash, the recovery agent may respond by rolling back the data within the SMR data buffer to a consistent state (e.g., the last successful atomic update) using information contained within the SMR log.

When the recovery agent receives an SMR_RECOVERY( ) request, it first consults the RA list (470, FIG. 4) to identify (1602) any SMRs used by the crashed client. The RA then locks the identified SMR (1604), and flushes (1606) the SMR data and the SMR log into the second level stable storage. The SMR log is flushed to the second level stable storage as a precautionary measure to increase the system reliability in case the recovery agent fails in the middle of SMR recovery process.

Next, at 1608, the recovery agent uses the SMR log (within the first level stable storage) to recovery or roll back the data within the SMR data buffer to a consistent state. In performing this recovery process, the recovery agent walks through each log entry and restores the corresponding segment within the SMR data buffer to its previous state as recorded in the log.

After an identified SMR has been "recovered" that SMR is unlocked (1610). If additional SMRs have been detected as being used by the crashed client, these SMRs may also be recovered in the manner described above. It will be appreciated that all entries within the SMR log occur as a result of an atomic transaction which was not successfully completed.

After a selected SMR has been recovered by the recovery agent, a restarted client may quickly attach to the recovered SMR and reinitialize itself using the consistent state data stored within the SMR data buffer by utilizing a fast in-memory operation, rather than the conventional technique of loading the consistent state data from the secondary file system. Additionally, the RA may choose to flush an SMR to the second level stable storage and release the in-memory SMR if it is determined that there are insufficient system resources for maintaining the in-memory SMR.

Figure 17B:
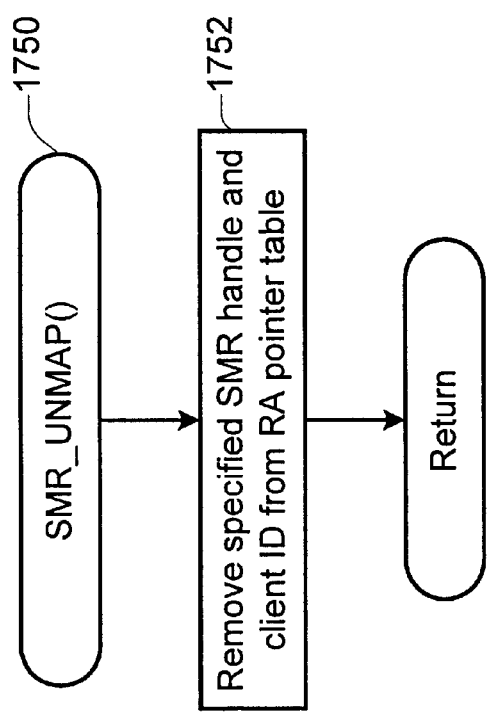
FIG. 17B shows a flow diagram of a specific embodiment of an SMR_UNMAP( ) Procedure 1750 of the present invention.
Figure 17A:
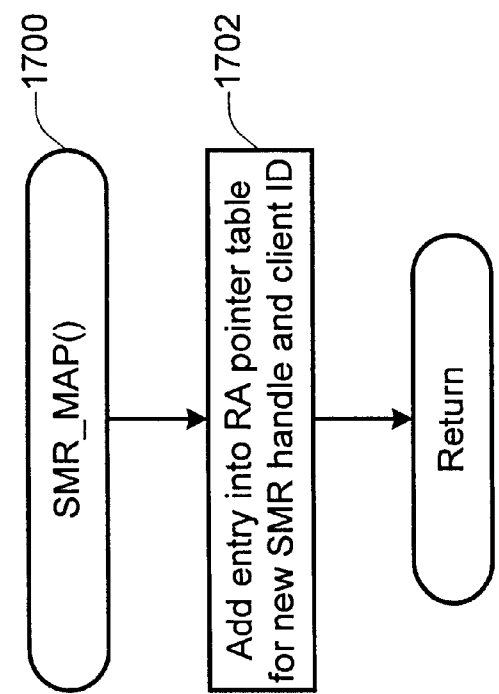
FIG. 17A shows a flow diagram of a specific embodiment of an SMR_MAP( ) Procedure 1700 of the present invention.

FIG. 17A shows a flow diagram of a specific embodiment of an SMR_MAP( ) Procedure 1700 of the present invention. The SMR_MAP( ) Procedure of FIG. 17A may be called, for example, by the SMR_CREATE( ) procedure 1400 of FIG. 14 in order to map a new SMR handle and associated client ID into the RA's SMR pointer table 470 (FIG. 4). According to a specific embodiment, when an SMR_MAP( ) request is sent to the RA, the SMR handle and associated client ID (i.e. the name or ID of the client associated with the SMR) are passed as input parameters to the SMR_MAP( ) request. Once this information is received at the RA, the RA adds (1702) an entry containing the specified SMR handle and client ID into the RA pointer table 470.

FIG. 17B shows a flow diagram of a specific embodiment of an SMR_UNMAP( ) Procedure 1750 of the present invention. The SMR_UNMAP( ) Procedure of FIG. 17B may be called, for example, by the SMR_DESTROY( ) procedure 1500 of FIG. 15 in order to remove an SMR handle and associated client ID from the RA's SMR pointer table 470 (FIG. 4). According to a specific embodiment, when an SMR_UNMAP( ) request is sent to the RA, the SMR handle and associated client ID are passed as input parameters to the SMR_UNMAP( ) request. In an alternate embodiment, only the SMR handle is passed as an input parameter. Once the SMR_UNMAP( ) request is received at the RA, the RA removes (1752) the table entry containing the specified SMR handle and client ID from the RA pointer table 470.

Figure 19:
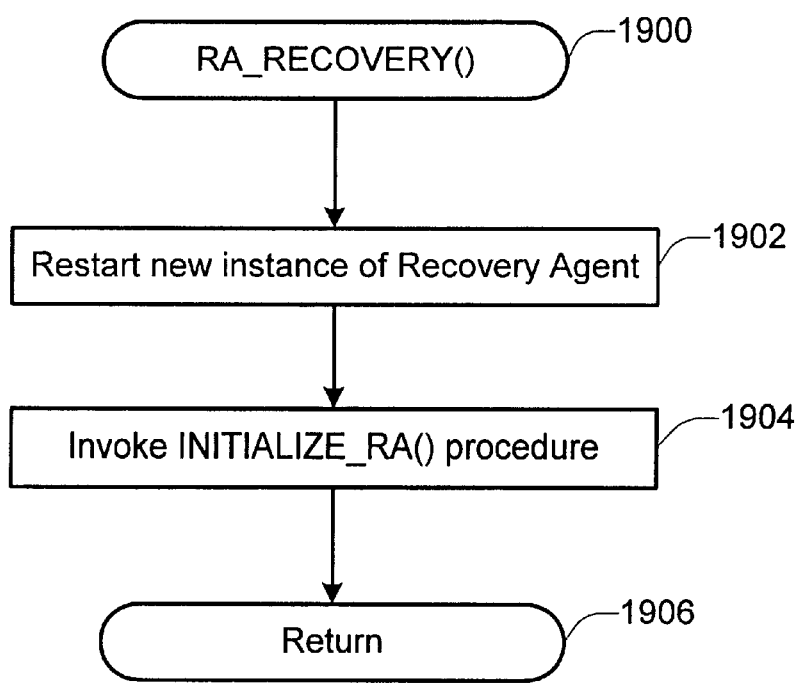
FIG. 19 shows a flow diagram of a specific embodiment of an RA_RECOVERY( ) procedure 1900.

FIG. 19 shows a flow diagram of a specific embodiment of an RA_RECOVERY( ) procedure 1900. The RA_RECOVERY( ) procedure may be called, for example, by the system manager procedure 1800 in response to detection of an RA crash, as described in FIG. 18 of the drawings. At 1902, a new instance of the RA is restarted. Thereafter, the restarted RA is initialized by invoking an INITIALIZE_RA( ) procedure (2004). The INITIALIZE_RA( ) procedure is described in greater detail with respect to FIG. 20 of the drawings.

Figure 20:
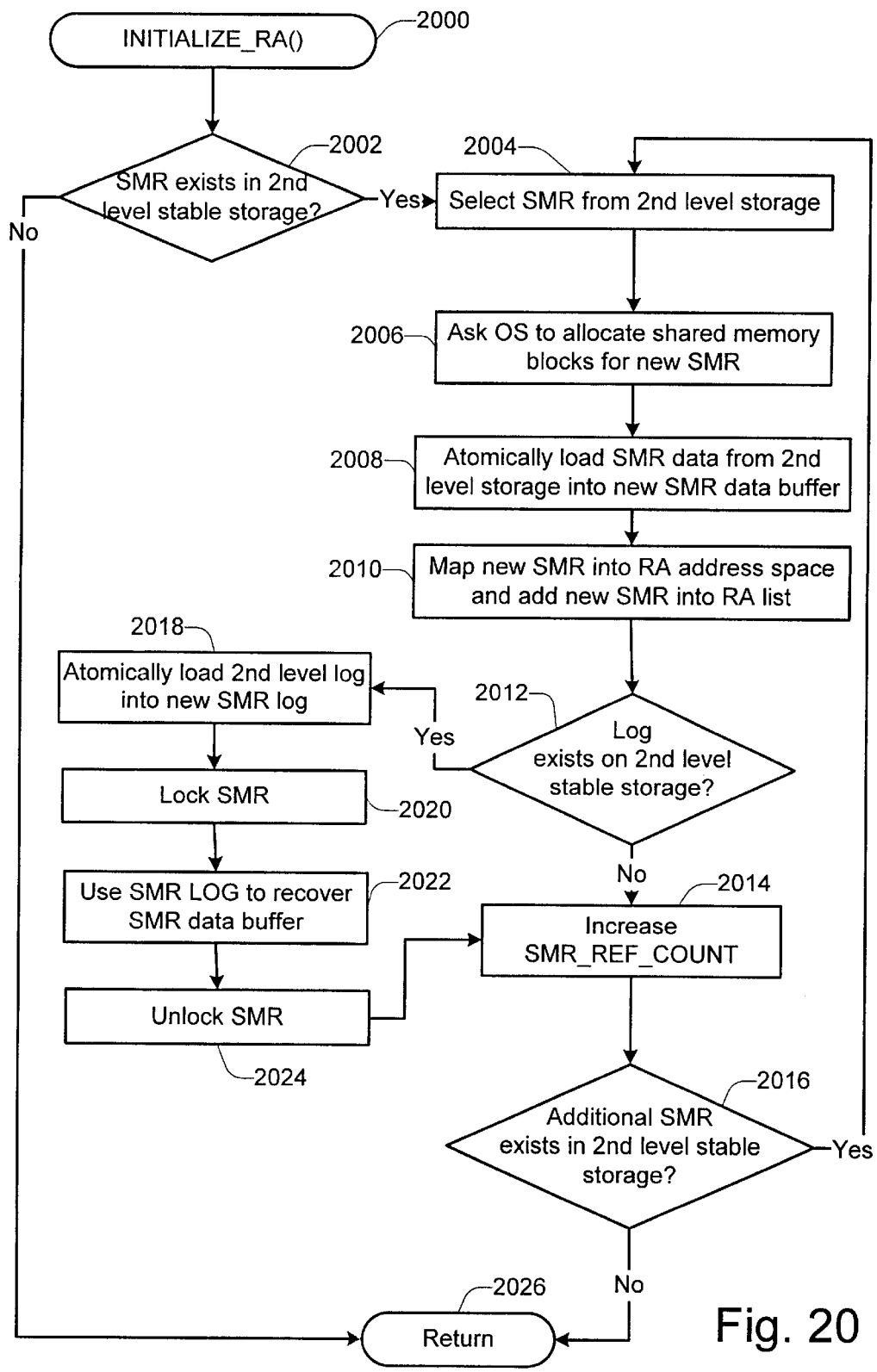
FIG. 20 shows a flow diagram of an INITIALIZE_RA( ) procedure 2000 in accordance with a specific embodiment of the present invention.

FIG. 20 shows a flow diagram of an INITIALIZE_RA( ) procedure 2000 in accordance with a specific embodiment of the present invention. This procedure may be automatically initiated, for example, by the RA during initialization. After an instance or thread of the recovery agent has been created, the recovery agent (RA) accesses the second level stable storage device to determine whether any SMR information is stored within the second level stable storage. Generally, the SMR information which exists within the second level stable storage occurs as a result of a flush operation being performed upon a first level SMR. When an SMR is no longer needed by the client process which created it, the first level SMR is released and any information within the second level stable storage relating to that SMR is released or destroyed. Therefore, when the recovery agent is initialized, it recreates any previously existing SMR's using the appropriate SMR information contained within the second level stable storage.

Accordingly, at 2002, the recovery agent checks the second level stable storage for the existence of any SMR data. If no SMR data is found within the second level stable storage, the recovery agent initialization procedure 2000 is finished.

However, assuming SMR information relating to one or more SMR files is stored within the second level stable storage, at 2004, a particular SMR and its related information within the second level storage is selected for restoration within the first level storage. At 2006, the recovery agent asks the OS to allocate shared memory blocks for a new SMR which is to include the information relating the selected SMR file within the second level storage. The OS will respond by allocating at least two shared memory blocks: a first memory block relating to the data buffer of the new SMR, and the second memory block relating to the log of the new SMR. At 2008, the SMR data from the second level storage is atomically loaded into the new SMR data buffer. During this loading process, it is preferable that access to the new SMR be limited exclusively to the agent which is in charge of writing the SMR data into the data buffer. At 2010, the RA requests the operating system to MAP the new SMR (i.e., SMR data buffer and SMR log) into the RA address space, and to add the new SMR handle into the RA list. The RA list represents the SMR pointer table 470 of FIG. 4. In order to add a new SMR into the RA list, an address pointer to the new SMR data buffer and an address pointer to the new SMR log are inserted into the appropriate locations within table 470.

At 2012, an inquiry is made as to whether a log (relating to the selected SMR file) exists within the second level stable storage. As stated previously, a log is used to keep track of state fragments which are updated during a single atomic transaction. Upon successful completion of the atomic transaction, all log entries for that transaction are deleted. Therefore, when a log file is encountered in the second level stable storage, it is assumed that an atomic transaction for the SMR associated with this log file was not successfully completed. Accordingly, the RA responds by using the SMR log to roll back the SMR data buffer to a consistent state which, presumably, will correspond the data from the last successfully completed atomic update.

Thus, when a log file for a related SMR is found to exist in a second level stable storage, at 2018, the log file is atomically loaded into the new SMR log. The SMR is then locked (2020) to provide exclusive access to the SMR data buffer. The recovery agent then uses the SMR log to recover the consistent SMR data, thereby restoring the SMR data buffer to a consistent state (2022). The SMR is then unlocked (2024) so that it may be concurrently accessible to multiple client processes.

After the SMR data buffer has been restored to a previous consistent state, or, in the alternative, if a log file related to the SMR is not found within the second level stable storage, at 2014, the SMR reference counter (460, FIG. 4) is incremented. The SMR reference counter is used to keep track of the total number of clients or agents which are using or accessing this particular SMR. A client may be considered to be using or accessing the SMR if the SMR has been mapped in that client's address space. In the specific embodiment of FIG. 20, the RA is counted as one of the client's accessing the SMR. For this reason, the SMR reference counters is incremented by one.

After a selected SMR from the second level storage has been recreated within the first level stable storage and restored to a consistent state, at 2016, the second level stable storage is checked for additional SMR files (or information relating to additional SMR files) which may exist within the second level stable storage. If additional SMR files are detected, the process returns to 2004, whereby a newly detected SMR is selected for restoration from within the second level storage. If no additional SMR's are detected within the second level stable storage, the RA initialization procedure 2000 returns (2026) to a previous flow control process.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

It is claimed:

1. A file system-based stable storage system in a computer system, said computer system including an operating system and at least one CPU, said system comprising:

at least one memory region, said memory region including at least one first data structure for storing data related to a client process;

said memory region being configured to support atomic access of data within said first data structure;

said memory region being further configured to share at least a portion of memory address space with said client process and said operating system;

said memory region being further configured to support direct memory to memory transfer of data from a client heap to said memory region;

wherein said client heap resides in a portion of memory allocated for said client process; and wherein said client process memory further includes at least one pointer which points to an address of said first data structure.

2. The system of claim 1 wherein said memory region is implemented as a stable memory region (SMR).

3. The file system-based stable storage system of claim 1 wherein said memory region further includes:

a log for tracking updates to data within said first data structure;

a memory based semaphore for providing exclusive access to said memory region; and a reference counter for keeping track of a number of clients accessing said memory region.

4. The file system-based stable storage system of claim 1 further including a recovery agent, said recovery agent being configured to share a portion of memory with said memory region.

5. The file system-based stable storage system of claim 4 wherein said recovery agent includes a plurality of address pointers for pointing to respective addresses associated with memory regions of the at least one memory region.

6. The storage system of claim 1, said system further including non-volatile memory configured to communicate with said memory region, said nonvolatile memory including at least one second data structure for storing said client process data;

said non-volatile memory being operable to support atomic access of said data within said second data structure.

7. A method for implementing a data storage data in a computer system, the system including at least one operating system and including non-volatile memory, said non-volatile memory including at least one second data structure for storing data related to a client application, the method comprising:

providing at least one memory region for storing said client application data;

the memory region being managed by the operating system and including at least one first data structure;

said memory region being configured to share at least a portion of memory address space with said operating system and with said client process;

said memory region being further configured to communicate with the non-volatile memory; and incrementally updating a portion of said client application data within said memory region using an atomic write operation.

8. The method of claim 7 further including implementing said memory region as a stable memory region (SMR).

9. The method of claim 7 further including configuring said memory region to provide concurrent access of said client application data to at least one other client.

10. The method of claim 7 further including configuring said memory region to be resilient to a client crash such that the memory region and data therein survives the client crash.

11. The method of claim 7 wherein said updating includes performing a memory to memory copy of a portion of data from a client heap to said memory region.

12. The method of claim 11 wherein said memory to memory copy is implemented using a pointer-based data transfer technique.

13. The method of claim 7 further including using said memory region to recover client data in response to detection of a client crash.

14. The method of claim 13 wherein said memory region using includes consulting a log file within said memory region to restore said memory region data to a consistent state.

15. The method of claim 13 further including retrieving consistent client data from said second data structure into said first data structure for use by said client application.

16. The method of claim 7 further including flushing client application data from said memory region to said non-volatile memory in response to a signal from said client.

17. A system for implementing a data storage data in a computer system, the system including at least one operating system and including non-volatile memory, said non-volatile memory including at least one second data structure for storing data related to a client application, the system comprising:

at least one processor;

at least one interface configured or designed to provide a communication link to at least one other network device in the data network; and memory;

the system being configured or designed to provide at least one memory region for storing said client application data;

the memory region being managed by the operating system and including at least one first data structure;

said memory region being configured to share at least a portion of memory address space with said operating system and with said client process;

said memory region being further configured to communicate with the non-volatile memory; and the system being further configured or designed to incrementally update a portion of said client application data within said memory region using an atomic write operation.

18. The system of claim 17 being further configured or designed to configure said memory region to provide concurrent access of said client application data to at least one other client.

19. The system of claim 17 being further configured or designed to configure said memory region to be resilient to a client crash such that the memory region and data therein survives the client crash.

20. The system of claim 17 being further configured or designed to perform a memory to memory copy of a portion of data from a client heap to said memory region.

21. The system of claim 20 wherein said memory to memory copy is implemented using a pointer-based data transfer technique.

22. The system of claim 17 being further configured or designed to use said memory region to recover client data in response to detection of a client crash.

23. The system of claim 22 being further configured or designed to consult a log file within said memory region to restore said memory region data to a consistent state.

24. The system of claim 22 being further configured or designed to retrieve consistent client data from said second data structure into said first data structure for use by said client application.

25. The system of claim 17 being further configured or designed to flush client application data from said memory region to said non-volatile memory in response to a signal from said client.

26. A system for implementing a data storage data in a computer system, the system including at least one operating system and including non-volatile memory, said non-volatile memory including at least one second data structure for storing data related to a client application, the system comprising:

means for providing at least one memory region for storing said client application data;

the memory region being managed by the operating system and including at least one first data structure;

said memory region being configured to share at least a portion of memory address space with said operating system and with said client process;

said memory region being further configured to communicate with the non-volatile memory; and means for incrementally updating a portion of said client application data within said memory region using an atomic write operation.

27. A computer program product for implementing a data storage data in a computer system, the system including at least one operating system and including non-volatile memory, said non-volatile memory including at least one second data structure for storing data related to a client application, the computer program product including a computer usable medium having computer readable code embodied therein, the computer readable code comprising computer code for enabling a computer to:

provide at least one memory region for storing said client application data;

the memory region being managed by the operating system and including at least one first data structure;

said memory region being configured to share at least a portion of memory address space with said operating system and with said client process;

said memory region being further configured to communicate with the non-volatile memory; and incrementally update a portion of said client application data within said memory region using an atomic write operation.

28. A data storage system in a computer system, the computer system including an operating system, at least one CPU and memory, the memory including main memory and at least one storage device including persistent memory; said data storage system comprising:

at least one memory region managed by the operating system;

the memory region including at least one first data structure for storing data related to a client process;

the memory region being operable to support atomic access of data within said first data structure;

wherein said memory region is implemented as a portion of the main memory managed by said operating system; and said portion of main memory being accessible by said client process and said operating system.

29. The data storage system of claim 28 wherein said memory region is further operable to retain said client process data after a failure of said client process.

30. The data storage system of claim 28 wherein said memory region is implemented as a memory cache within the main memory.

31. The data storage system of claim 28 wherein said memory region is further configured to support direct memory to memory transfer of data from a client heap to said memory region.

32. The data storage system of claim 28 wherein the data storage system is configured or designed to perform incremental updating of at least a portion of said client process data within said memory region.

33. The data storage system of claim 28 wherein the memory region is implemented using RAM.

34. The data storage system of claim 28 wherein said data storage system corresponds to a file system-based system.

* * * * *